(12) United States Patent
Song et al.

(10) Patent No.: US 12,469,326 B2
(45) Date of Patent: Nov. 11, 2025

(54) DISPLAY DEVICE

(71) Applicant: Samsung Display Co., Ltd., Yongin-si (KR)

(72) Inventors: Heerim Song, Yongin-si (KR); Heejean Park, Yongin-si (KR); Yujin Lee, Yongin-si (KR); Cheol-Gon Lee, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/114,399

(22) Filed: Feb. 27, 2023

(65) Prior Publication Data

US 2023/0368566 A1 Nov. 16, 2023

(30) Foreign Application Priority Data

May 11, 2022 (KR) ........................ 10-2022-0057623

(51) Int. Cl.
*G06V 40/13* (2022.01)
*G09G 3/3233* (2016.01)
*H10K 59/35* (2023.01)
*H10K 59/65* (2023.01)

(52) U.S. Cl.
CPC ....... *G06V 40/1318* (2022.01); *G09G 3/3233* (2013.01); *H10K 59/352* (2023.02); *H10K 59/353* (2023.02); *H10K 59/65* (2023.02); *G09G 2300/0819* (2013.01); *G09G 2300/0842* (2013.01); *G09G 2310/08* (2013.01); *G09G 2354/00* (2013.01); *G09G 2360/14* (2013.01)

(58) Field of Classification Search
CPC .. G06V 40/1318; H10K 59/65; H10K 59/352; H10K 59/353
See application file for complete search history.

(56) References Cited

U.S. PATENT DOCUMENTS

| | | | | |
|---|---|---|---|---|
| 2005/0099378 A1* | 5/2005 | Kim | ..................... | G09G 3/3614 345/99 |
| 2007/0114934 A1* | 5/2007 | Lim | ........................ | H01J 11/12 313/584 |
| 2012/0313913 A1* | 12/2012 | Shiraki | ................. | G06F 3/0412 345/207 |

(Continued)

FOREIGN PATENT DOCUMENTS

KR 10-2020-0094791 8/2020

*Primary Examiner* — Sepehr Azari
(74) *Attorney, Agent, or Firm* — Sughrue Mion, PLLC

(57) ABSTRACT

A display device includes a base layer and a pixel layer that is disposed on the base layer and that includes a plurality of reference pixel units and a plurality of sensors. Each of the plurality of reference pixel units includes a first light emitting element, a second light emitting element, and a third light emitting element. Each of the plurality of sensors includes a light sensing element disposed between two second light emitting elements adjacent to each other in a first direction and disposed between the first and third light emitting elements in a second direction intersecting the first direction. The second light emitting element has a different shape from the first and third light emitting elements, and the light sensing element has a different shape from the first and third light emitting elements.

27 Claims, 19 Drawing Sheets

(56) References Cited

U.S. PATENT DOCUMENTS

| | | | |
|---|---|---|---|
| 2013/0234917 A1* | 9/2013 | Lee | H10K 59/353 |
| | | | 345/82 |
| 2015/0192834 A1* | 7/2015 | Morinaga | G02F 1/136213 |
| | | | 349/39 |
| 2016/0086044 A1* | 3/2016 | Yu | G06V 40/1318 |
| | | | 250/226 |
| 2017/0186836 A1* | 6/2017 | Tada | H10K 59/123 |
| 2018/0019288 A1* | 1/2018 | Yang | H01L 27/1255 |
| 2019/0035859 A1* | 1/2019 | Kang | G06F 3/0412 |
| 2019/0067385 A1* | 2/2019 | Xu | H10K 65/00 |
| 2020/0050063 A1* | 2/2020 | Yoshida | G02F 1/134336 |
| 2020/0184178 A1* | 6/2020 | Zhou | H10K 59/65 |
| 2020/0203445 A1* | 6/2020 | Ou | H10K 59/122 |
| 2020/0265210 A1* | 8/2020 | Sun | G02F 1/13338 |
| 2020/0272012 A1* | 8/2020 | Yoshida | G02F 1/136286 |
| 2020/0321413 A1 | 10/2020 | Hong | |
| 2020/0381492 A1* | 12/2020 | Ryu | H10K 59/65 |
| 2021/0042493 A1* | 2/2021 | Lius | G09G 3/3208 |
| 2021/0384270 A1* | 12/2021 | Liu | H10K 59/122 |
| 2022/0012453 A1* | 1/2022 | Choi | G09G 3/3233 |
| 2022/0057900 A1* | 2/2022 | Xiang | G06F 3/0443 |
| 2022/0285451 A1* | 9/2022 | Hong | G06F 3/0446 |
| 2023/0051710 A1* | 2/2023 | Abe | H10K 39/32 |
| 2023/0135563 A1* | 5/2023 | Shin | H10K 59/65 |
| | | | 257/40 |
| 2023/0263010 A1* | 8/2023 | Lv | H10K 71/16 |
| | | | 257/40 |

* cited by examiner

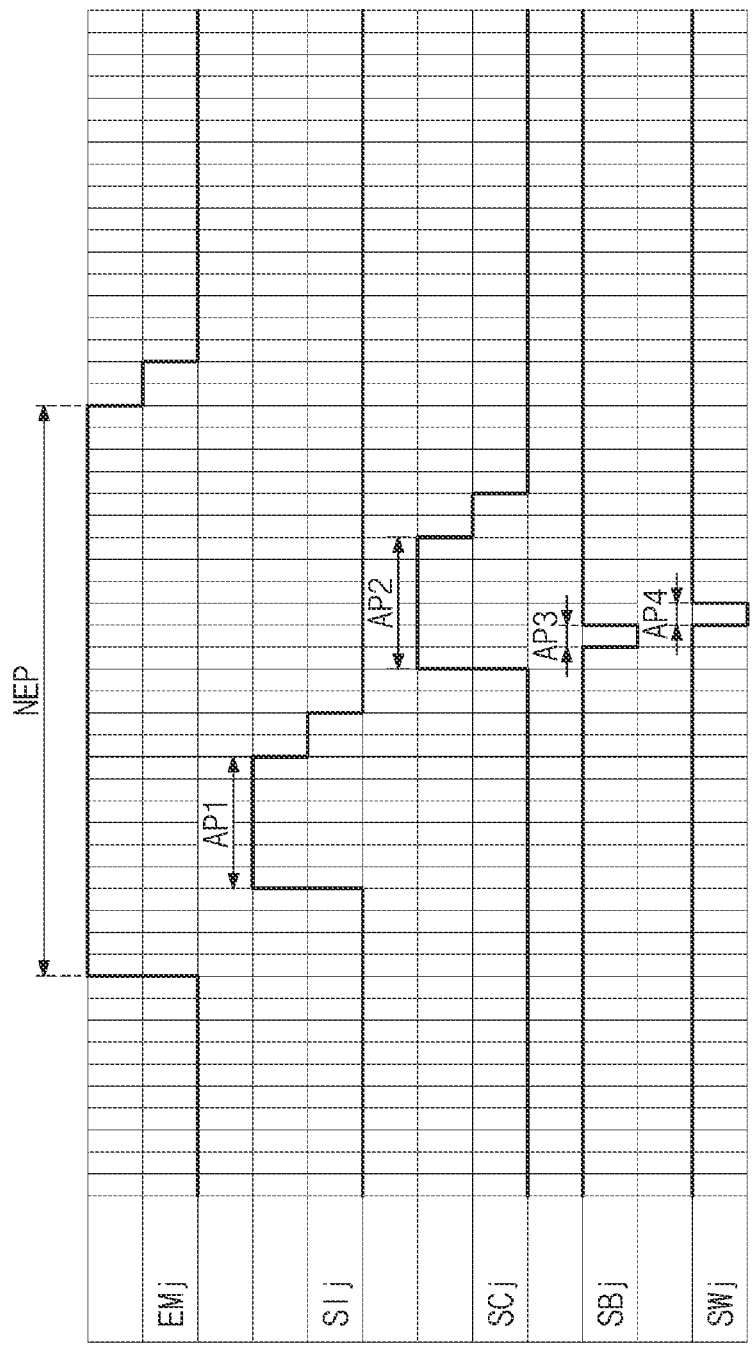

DISPLAY DEVICE

CROSS-REFERENCE TO RELATED APPLICATION(S)

This application claims priority to and benefits of Korean Patent Application No. 10-2022-0057623 under 35 U.S.C. § 119, filed on May 11, 2022, in the Korean Intellectual Property Office, the entire contents of which are incorporated herein by reference.

BACKGROUND

1. Technical Field

Embodiments relate to a display device capable of biometric information recognition.

2. Description of the Related Art

A display device provides various functions that a user interacts with the display device. For example, the display device displays an image to provide information to the user, or may sense an input of the user. Recent display devices include a function of sensing biometric information of a user.

Biometric information is recognized by using a capacitive sensing technique for sensing a change in capacitance formed between electrodes, a light sensing technique for sensing incident light using an optical sensor, or an ultrasonic sensing technique for sensing vibration using a piezoelectric element.

SUMMARY

Embodiments provide a display device having improved sensing performance of a sensor for biometric information recognition.

However, embodiments of the disclosure are not limited to those set forth herein. The above and other embodiments will become more apparent to one of ordinary skill in the art to which the disclosure pertains by referencing the detailed description of the disclosure given below.

According to an embodiment, a display device may include a base layer and a pixel layer that is disposed on the base layer and that includes a plurality of reference pixel units and a plurality of sensors. Each of the plurality of reference pixel units may include a first light emitting element, a second light emitting element, and a third light emitting element. Each of the plurality of sensors may include a light sensing element disposed between two second light emitting elements adjacent to each other in a first direction and disposed between the first and third light emitting elements in a second direction intersecting the first direction. The second light emitting element may have a different shape from the first and third light emitting elements, and the light sensing element may have a different shape from the first and third light emitting elements.

Each of the first and third light emitting elements may have an octagonal shape having a first length in the first direction and a second length in the second direction smaller than the first length in the first direction, the second light emitting element may have an octagonal shape having same lengths in the first direction and the second direction, and the light sensing element may have a rectangular shape.

Each of the first and third light emitting elements may include first and second sides parallel to the first direction, third and fourth sides parallel to the second direction, and first to fourth inclined sides inclined with respect to the first and second directions, the first and second sides may be longer than the third and fourth sides, and the first to fourth inclined sides may have a same length.

Vertical sides of the light sensing element parallel to the first direction may have a length smaller than or equal to lengths of the first and second sides of each of the first and third light emitting elements.

The second light emitting element may include first and second sides parallel to the first direction, third and fourth sides parallel to the second direction, and first to fourth inclined sides inclined with respect to the first and second directions, the first and second sides and the third and fourth sides may have a same length, and the first to fourth inclined sides may have a same length.

Each of the first and third light emitting elements may have a rectangular shape having a first length in the first direction and a second length in the second direction smaller than the first length in the first direction, and the second light emitting element and the light sensing element may have a square shape.

Vertical sides of the light sensing element parallel to the first direction may have a length smaller than or equal to lengths of first and second sides of each of the first and third light emitting elements parallel to the first direction.

At least one of the second light emitting element and the light sensing element may have a circular shape.

The second light emitting element may have an oval shape, and the light sensing element may have the circular shape.

Each of the first and third light emitting elements may include first and second sides having a linear shape parallel to the first direction and third and fourth sides having a round shape.

Each of the first and third light emitting elements may have an oval shape having a major axis parallel to the first direction.

Each of the first and third light emitting elements may have an octagonal shape having a first length in the first direction and a second length in the second direction smaller than the first length in the first direction, the second light emitting element may have an octagonal shape having a first length in the second direction and a second length in the first direction smaller than the first length in the second direction, and the light sensing element may have a square shape.

Each of the first and third light emitting elements may include first and second sides parallel to the first direction, third and fourth sides parallel to the second direction, and first to fourth inclined sides inclined with respect to the first and second directions, the first and second sides may be longer than the third and fourth sides, and the first to fourth inclined sides may have a same length.

Vertical sides of the light sensing element parallel to the second direction may have a length smaller than or equal to lengths of the third and fourth sides of each of the first and third light emitting elements.

The second light emitting element may include first and second sides parallel to the first direction, third and fourth sides parallel to the second direction, and first to fourth inclined sides inclined with respect to the first and second directions, and the first and second sides may be shorter than the third and fourth sides.

The first and third inclined sides of the second light emitting element may face each other, and have a same length, the second and fourth inclined sides of the second light emitting element may face each other and have a same length, and the first and second inclined sides of the second light emitting element may have different lengths.

Each of the plurality of sensors may further include: a light sensing unit; and a sensor drive circuit that drives the light sensing unit, the light sensing unit may include k light sensing elements, and one of the k light sensing elements may be connected to the sensor drive circuit, k being an integer of 1 or larger.

Each of the plurality of sensors may further include at least one routing wire electrically connecting the k light sensing elements.

Each of the plurality of reference pixel units may include a first pixel including the first light emitting element, two second pixels, each of which includes the second light emitting element, and a third pixel including the third light emitting element, and two light sensing elements may be disposed in each of the plurality of reference pixel units.

According to an embodiment, a display device may include a base layer and a pixel layer that is disposed on the base layer and that includes a plurality of reference pixel units and a plurality of sensors. Each of the plurality of reference pixel units may include a first light emitting element, a second light emitting element, and a third light emitting element. Each of the plurality of sensors may include a light sensing element disposed between two second light emitting elements adjacent to each other in a first direction and disposed between the first and third light emitting elements in a second direction intersecting the first direction. Each of the first and third light emitting elements may include first and second sides parallel to the first direction, and the light sensing element has a different shape from the first and third light emitting elements. The light sensing element may include vertical sides having a length smaller than or equal to lengths of the first and second sides of each of the first and third light emitting elements.

Each of the first to third light emitting elements may have a square shape, and the light sensing element may have a rectangular shape having a first length in the first direction and a second length in the second direction smaller than the first length the first direction.

Each of the first to third light emitting elements may have an octagonal shape having same lengths in the first direction and the second direction, and the light sensing element may have a rectangular shape having a first length in the first direction and a second length in the second direction smaller than the first length in the first direction.

Each of the first to third light emitting elements may include first and second sides parallel to the first direction, third and fourth sides parallel to the second direction, and first to fourth inclined sides inclined with respect to the first and second directions, the first and second sides and the third and fourth sides may have a same length, and the first to fourth inclined sides may have a same length.

The first to third light emitting elements may have different sizes.

The second light emitting element may have a smaller size than the first and third light emitting elements, and the first light emitting element may have a size smaller than or equal to a size of the third light emitting element.

The first light emitting element may be configured to emit red light, the second light emitting element may be configured to emit green light, and the third light emitting element may be configured to emit blue light.

Each of the plurality of sensors may further include: a light sensing unit; and a sensor drive circuit that drives the light sensing unit, the light sensing unit may include k light sensing elements, and at least one of the k light sensing elements may be connected to the sensor drive circuit, k being an integer of 1 or larger.

Each of the plurality of sensors may further include at least one routing wire electrically connecting the k light sensing elements.

Each of the plurality of reference pixel units may include a first pixel including the first light emitting element, two second pixels, each of which includes the second light emitting element, and a third pixel including the third light emitting element, and two light sensing elements may be disposed in each of the plurality of reference pixel units.

BRIEF DESCRIPTION OF THE DRAWINGS

The above and other objects and features of the disclosure will become apparent by describing in detail embodiments thereof with reference to the accompanying drawings.

FIG. 6B is a waveform diagram for describing operations of the pixel and the sensor illustrated in FIG. 6A.

DETAILED DESCRIPTION OF THE EMBODIMENTS

Figure 1:
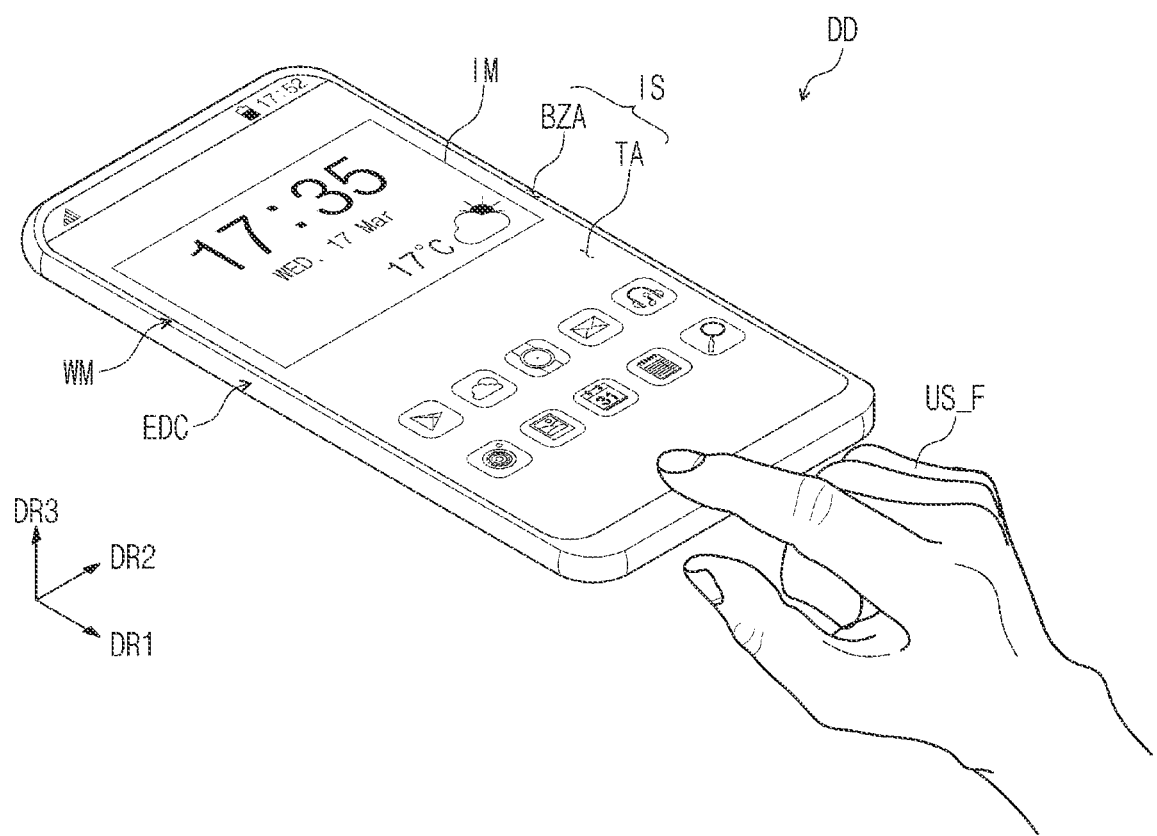
FIG. 1 is a schematic perspective view of a display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the X, Y, and Z-axes, and may be interpreted in a broader sense. For example, the DR1-axis, the DR2-axis, and the DR3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Hereinafter, embodiments will be described with reference to the accompanying drawings.

Figure 2:
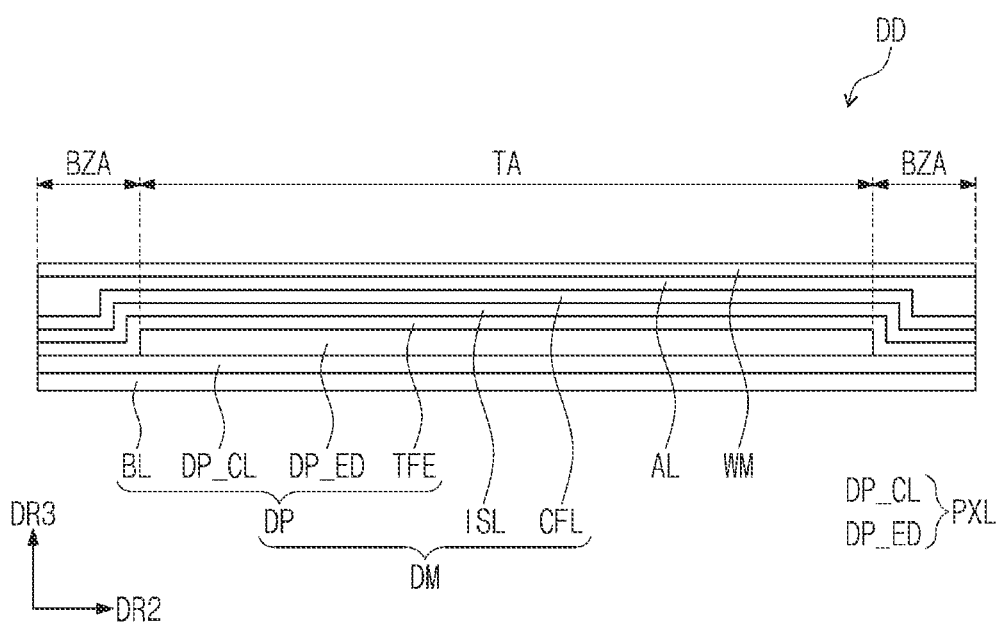
FIG. 2 is a schematic sectional view of the display device according to an embodiment.

FIG. 1 is a schematic perspective view of a display device according to an embodiment. FIG. 2 is a schematic sectional view of the display device according to an embodiment.

Referring to FIGS. 1 and 2, the display device DD according to an embodiment may have a rectangular shape with long sides parallel to a first direction DR1 and short sides parallel to a second direction DR2 intersecting the first direction DR1. However, embodiments are not limited thereto. For example, the display device DD may have various shapes such as a circular shape, a polygonal shape, and the like.

The display device DD may be a device activated in response to an electrical signal. The display device DD may include various embodiments. For example, the display device DD may be applied to an electronic device such as a smart watch, a tablet computer, a notebook computer, a computer, a smart television, or the like.

Hereinafter, a normal direction substantially perpendicular to a plane defined by the first direction DR1 and the second direction DR2 is defined as a third direction DR3. As used herein, the expression "when viewed on the plane" may mean that it is viewed in the third direction DR3.

An upper surface of the display device DD may be defined as a display surface IS and may be parallel to the plane defined by the first direction DR1 and the second direction DR2. Images IM generated by the display device DD may be provided to a user through the display surface IS.

The display surface IS may include a transmissive area TA and a bezel area BZA. The transmissive area TA may be an area where the images IM are displayed. The user visually recognizes the images IM through the transmissive area TA. In an embodiment, the transmissive area TA is illustrated in a rounded rectangular shape. However, embodiments are not limited thereto, and the transmissive area TA may have various shapes.

The bezel area BZA may be adjacent to the transmissive area TA. The bezel area BZA may have a certain color. The bezel area BZA may surround the transmissive area TA. Accordingly, the shape of the transmissive area TA may be substantially defined by the bezel area BZA. However, embodiments are not limited thereto, and the bezel area BZA may be disposed adjacent to only one side of the transmissive area TA, or may be omitted.

The display device DD may sense an external input applied from the outside. The external input may include various forms of inputs provided from outside the display device DD. For example, the external input may include not only contact by a body part such as a hand US_F of the user or contact by a separate device (e.g., an active pen or a digitizer) but also an external input (e.g., hovering) that is applied in proximity to the display device DD or applied adjacent to the display device DD at a certain distance. Furthermore, the external input may have various forms such as force, pressure, temperature, light, and the like.

The display device DD may sense the user's biometric information applied from the outside. A biometric information sensing area capable of sensing the user's biometric information may be provided on the display surface IS of the display device DD. The biometric information sensing area may be provided in the entire region of the transmissive area TA, or may be provided in a partial region of the transmissive area TA. FIG. 1 illustrates one example that the entire transmissive area TA is used as the biometric information sensing area.

The display device DD may include a window WM, a display module DM, and a housing EDC. In an embodiment, the window WM and the housing EDC may be coupled to form the exterior of the display device DD.

The front surface of the window WM may form the display surface IS of the display device DD. The window WM may include an optically clear insulating material. For example, the window WM may include glass or plastic. The window WM may have a multi-layer structure or a single-layer structure. For example, the window WM may include plastic films coupled by an adhesive, or may include a glass substrate and a plastic film coupled by an adhesive.

The display module DM may include a display panel DP and an input sensing layer ISL. The display panel DP may display an image in response to an electrical signal, and the input sensing layer ISL may sense an external input applied from the outside. The external input may be provided in various forms.

The display panel DP according to an embodiment may be an emissive display panel, but embodiments are not limited thereto. For example, the display panel DP may be an organic light emitting display panel, an inorganic light emitting display panel, or a quantum-dot light emitting display panel. A light emitting layer of the organic light emitting display panel may include an organic light emitting material, and a light emitting layer of the inorganic light emitting display panel may include an inorganic light emitting material. A light emitting layer of the quantum-dot light emitting display panel may include quantum dots or quantum rods. Hereinafter, the display panel DP will be described as an organic light emitting display panel.

Referring to FIG. 2, the display panel DP may include a base layer BL, a pixel layer PXL, and an encapsulation layer TFE. The display panel DP according to an embodiment may be a flexible display panel. However, embodiments are not limited thereto. For example, the display panel DP may be a foldable display panel that is folded about a folding axis, or a rigid display panel.

The base layer BL may include a synthetic resin layer. The synthetic resin layer may be a polyimide-based resin layer, and the material thereof is not limited thereto. For example, the base layer BL may include a glass substrate, a metal substrate, or an organic/inorganic composite substrate.

The pixel layer PXL may be disposed on the base layer BL. The pixel layer PXL may include a circuit layer DP_CL and an element layer DP_ED. The circuit layer DP_CL may be disposed between the base layer BL and the element layer DP_ED. The circuit layer DP_CL may include at least one insulating layer and a circuit element. Hereinafter, the insulating layer included in the circuit layer DP_CL is referred to as the intermediate insulating layer. The intermediate insulating layer may include at least one intermediate inorganic film and at least one intermediate organic film. The circuit element may include a pixel drive circuit included in each of pixels for displaying an image and a sensor drive circuit included in each of sensors for recognizing external information. The external information may be biometric information. In an embodiment, the sensor may be a fingerprint recognition sensor, a proximity sensor, an iris recognition sensor, or the like. Furthermore, the sensor may be an optical sensor for optically recognizing biometric information. The circuit layer DP_CL may further include signal lines connected to the pixel drive circuit and/or the sensor drive circuit.

The element layer DP_ED may include a light emitting element included in each of the pixels and a light sensing element included in each of the sensors. In an embodiment, the light sensing element may be a photo diode. The light sensing element may be a sensor that senses, or reacts to, light reflected by a fingerprint of the user. The circuit layer DP_CL and the element layer DP_ED will be described below in detail with reference to FIGS. 12, 13A, and 13B.

The encapsulation layer TFE may encapsulate the element layer DP_ED. The encapsulation layer TFE may include at least one organic film and at least one inorganic film. The inorganic film may include an inorganic material and may protect the element layer DP_ED from moisture/oxygen. The inorganic film may include, but embodiments are not limited to, e.g., a silicon nitride layer, a silicon oxy-nitride layer, a silicon oxide layer, a titanium oxide layer, or an aluminum oxide layer. The organic film may include an organic material and may protect the element layer DP_ED from foreign matter such as dust particles.

The input sensing layer ISL may be formed on the display panel DP. The input sensing layer ISL may be disposed (e.g., directly disposed) on the encapsulation layer TFE. According to an embodiment, the input sensing layer ISL may be formed on the display panel DP by a continuous process. In case that the input sensing layer ISL is disposed (e.g., directly disposed) on the display panel DP, an adhesive film may not be disposed between the input sensing layer ISL and the encapsulation layer TFE. In another example, an adhesive film may be disposed between the input sensing layer ISL and the display panel DP. For example, the input sensing layer ISL may not be manufactured together with the display panel DP by a continuous process and may be manufactured separately from the display panel DP and fixed to the upper surface of the display panel DP by the adhesive film.

The input sensing layer ISL may sense an external input (e.g., a touch of the user), may change the sensed external input to a certain input signal, and may provide the input signal to the display panel DP. The input sensing layer ISL may include sensing electrodes for sensing the external input. The sensing electrodes may sense the external input in a capacitive manner. The display panel DP may receive the input signal from the input sensing layer ISL and may generate an image corresponding to the input signal.

The display module DM may further include a color filter layer CFL. In an embodiment, the color filter layer CFL may be disposed on the input sensing layer ISL. However, embodiments are not limited thereto. The color filter layer CFL may be disposed between the display panel DP and the input sensing layer ISL. The color filter layer CFL may include color filters and a black matrix.

The structures of the input sensing layer ISL and the color filter layer CFL will be described below in detail.

The display device DD according to an embodiment may further include an adhesive layer AL. The window WM may be attached to the input sensing layer ISL by the adhesive layer AL. The adhesive layer AL may include an optically clear adhesive, an optically clear adhesive resin, or a pressure sensitive adhesive (PSA).

The housing EDC may be coupled with the window WM. The housing EDC may be coupled with the window WM to provide a certain inner space. The display module DM may be accommodated in the inner space. The housing EDC may include a material having a relatively high stiffness. For example, the housing EDC may include glass, plastic, or metal, or may include frames and/or plates formed of a combination thereof. The housing EDC may stably protect components of the display device DD accommodated in the inner space from an external impact. For example, a battery module for supplying power required for overall operation of the display device DD may be disposed between the display module DM and the housing EDC.

Figure 3:
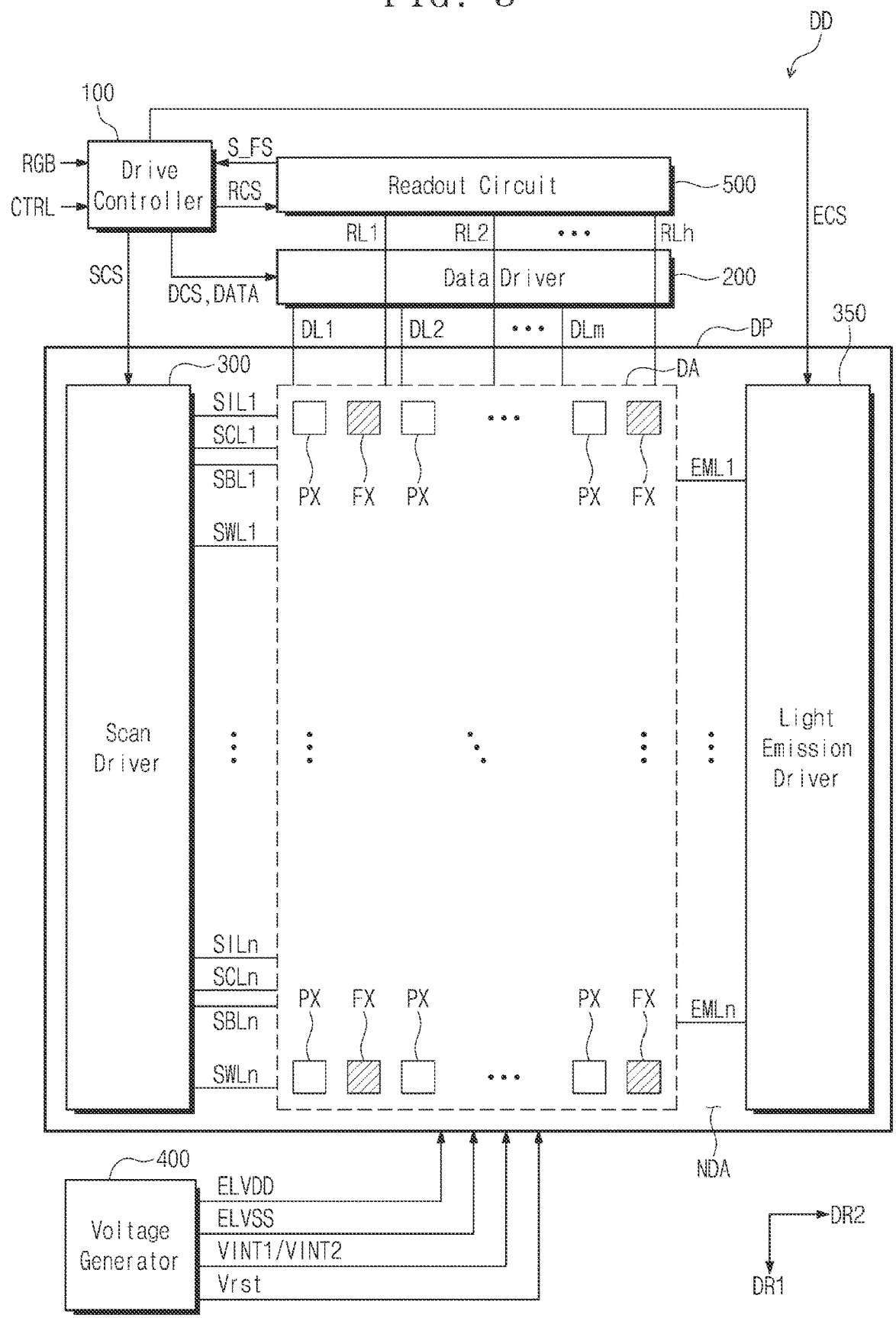
FIG. 3 is a schematic block diagram of the display device according to an embodiment.

FIG. 3 is a block diagram of the display device according to an embodiment.

Referring to FIG. 3, the display device DD may include the display panel DP, a panel driver, and a drive controller 100. In an embodiment, the panel driver may include a data driver 200, a scan driver 300, a light emission driver 350, a voltage generator 400, and a readout circuit 500.

The drive controller 100 may receive an image signal RGB and a control signal CTRL. The drive controller 100 may generate image data DATA by converting the data format of the image signal RGB according to the specification of an interface with the data driver 200. The drive controller 100 may output a first control signal SCS, a second control signal ECS, a third control signal DCS, and a fourth control signal RCS.

The data driver 200 may receive the third control signal DCS and the image data DATA from the drive controller 100. The data driver 200 may convert the image data DATA into data signals and may output the data signals to data lines DL1 to DLm to be described below. The data signals may be analog voltages corresponding to the gray level value of the image data signal DATA.

The scan driver 300 may receive the first control signal SCS from the drive controller 100. The scan driver 300 may output scan signals to scan lines in response to the first control signal SCS.

The voltage generator 400 may generate voltages required for operation of the display panel DP. In an embodiment, the voltage generator 400 may generate a first drive voltage ELVDD, a second drive voltage ELVSS, a first initialization voltage VINT1, and a second initialization voltage VINT2.

The display panel DP may include a display area DA corresponding to the transmissive area TA (illustrated in FIG. 1) and a non-display area NDA corresponding to the bezel area BZA (illustrated in FIG. 1).

The display panel DP may include pixels PX disposed in the display area DA and sensors FX disposed in the display area DA. In an embodiment, each of the sensors FX may be disposed between two pixels PX adjacent to each other. The pixels PX and the sensors FX may be alternately disposed in the first and second directions DR1 and DR2. However, embodiments are not limited thereto. For example, two or more pixels PX may be disposed between two sensors FX adjacent to each other in the first direction DR1 among the sensors FX, or two or more pixels PX may be disposed between two sensors FX adjacent to each other in the second direction DR2 among the sensors FX.

The display panel DP may further include initialization scan lines SIL1 to SILn, compensation scan lines SCL1 to SCLn, write scan lines SWL1 to SWLn, black scan lines SBL1 to SBLn, light emission control lines EML1 to EMLn, the data lines DL1 to DLm, and readout lines RL1 to RLh. The initialization scan lines SIL1 to SILn, the compensation scan lines SCL1 to SCLn, the write scan lines SWL1 to SWLn, the black scan lines SBL1 to SBLn, and the light emission control lines EML1 to EMLn may extend in the second direction DR2. The initialization scan lines SIL1 to SILn, the compensation scan lines SCL1 to SCLn, the write scan lines SWL1 to SWLn, the black scan lines SBL1 to SBLn, and the light emission control lines EML1 to EMLn may be arranged in the first direction DR1 so as to be spaced apart from each other. The data lines DL1 to DLm and the readout lines RL1 to RLh may extend in the first direction DR1 and may be arranged in the second direction DR2 so as to be spaced apart from each other.

The pixels PX may be connected (e.g., electrically connected) to the initialization scan lines SIL1 to SILn, the compensation scan lines SCL1 to SCLn, the write scan lines SWL1 to SWLn, the black scan lines SBL1 to SBLn, the light emission control lines EML1 to EMLn, and the data lines DL1 to DLm, respectively. For example, each of the pixels PX may be connected (e.g., electrically connected) to four scan lines. However, embodiments are not limited thereto, the number of scan lines connected to each pixel PX may be changed.

The sensors FX may be connected (e.g., electrically connected) to the write scan lines SWL1 to SWLn and the readout lines RL1 to RLh, respectively. Each of the sensors FX may be connected (e.g., electrically connected) to one scan line. However, embodiments are not limited thereto. The number of scan lines connected to each sensor FX may be varied. In an embodiment, the number of readout lines RL1 to RLh may correspond to ½ (or half) of the number of data lines DL1 to DLm. However, embodiments are not limited thereto. In another example, the number of readout lines RL1 to RLh may correspond to ¼ or ⅛ of the number of data lines DL1 to DLm.

The scan driver 300 may be disposed in the non-display area NDA of the display panel DP. The scan driver 300 may receive the first control signal SCS from the drive controller 100. In response to the first control signal SCS, the scan driver 300 may output initialization scan signals to the initialization scan lines SIL1 to SILn and may output compensation scan signals to the compensation scan lines SCL1 to SCLn. Furthermore, in response to the first control signal SCS, the scan driver 300 may output write scan signals to the write scan lines SWL1 to SWLn and may output black scan signals to the black scan lines SBL1 to SBLn. In another example, the scan driver 300 may include first and second scan drivers. The first scan driver may output the initialization scan signals and the compensation scan signals, and the second scan driver may output the write scan signals and the black scan signals.

The light emission driver 350 may be disposed in the non-display area NDA of the display panel DP. The light emission driver 350 may receive the second control signal ECS from the drive controller 100. The light emission driver 350 may output light emission control signals to the light emission control lines EML1 to EMLn in response to the second control signal ECS. In another example, the scan driver 300 may be connected to the light emission control lines EML1 to EMLn. For example, the light emission driver 350 may be omitted, and the scan driver 300 may output the light emission control signals to the light emission control lines EML1 to EMLn.

The readout circuit 500 may receive the fourth control signal RCS from the drive controller 100. In response to the fourth control signal RCS, the readout circuit 500 may receive readout signals from the readout lines RL1 to RLh. The readout circuit 500 may generate sensing signals S_FS by processing the readout signals received from the readout lines RL1 to RLh and may provide the generated sensing signals S_FS to the drive controller 100. The drive controller 100 may recognize biometric information based on the sensing signals S_FS.

Figure 4:
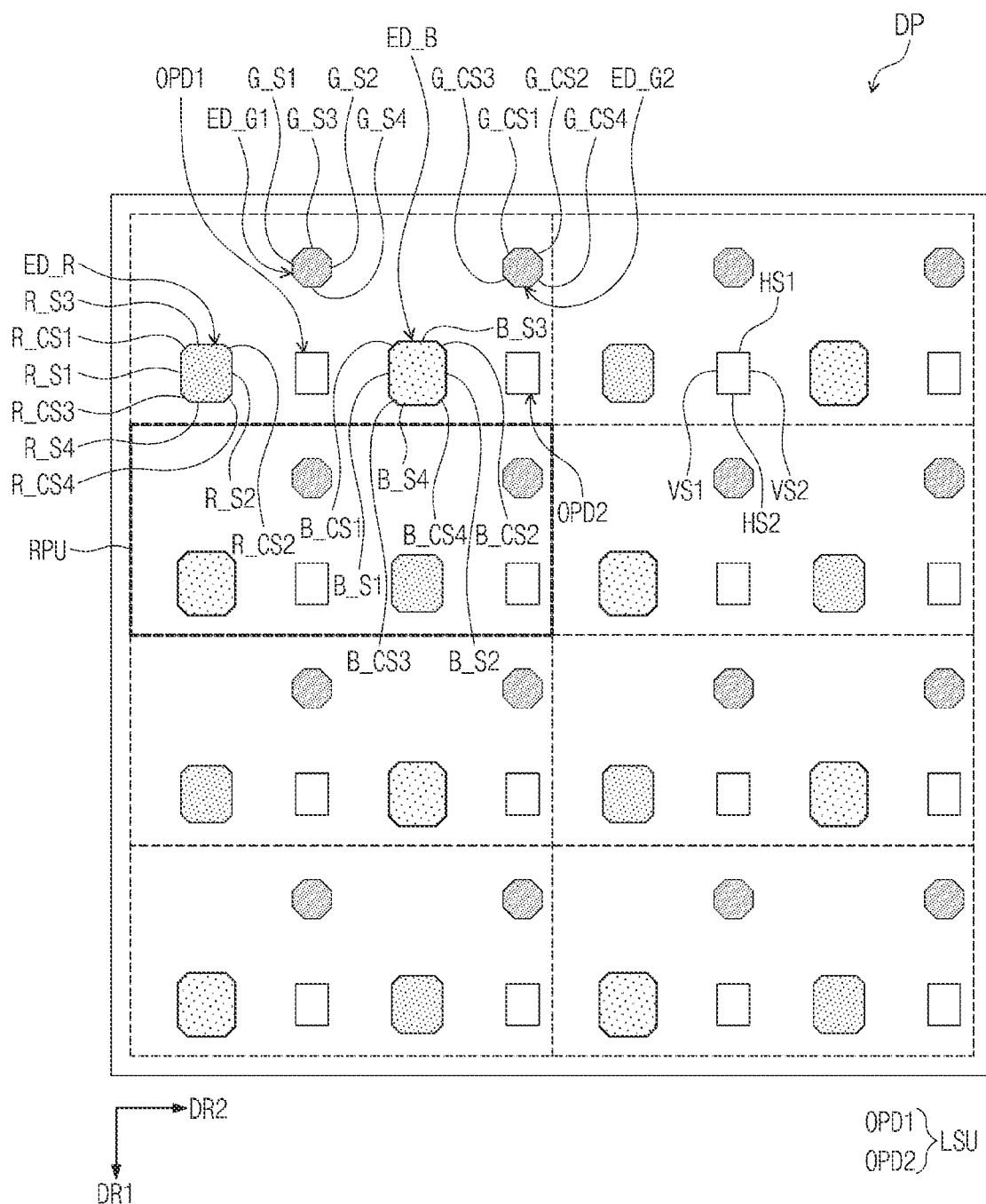
FIG. 4 is a schematic enlarged plan view of a partial area of a display panel according to an embodiment.
Figure 5A:
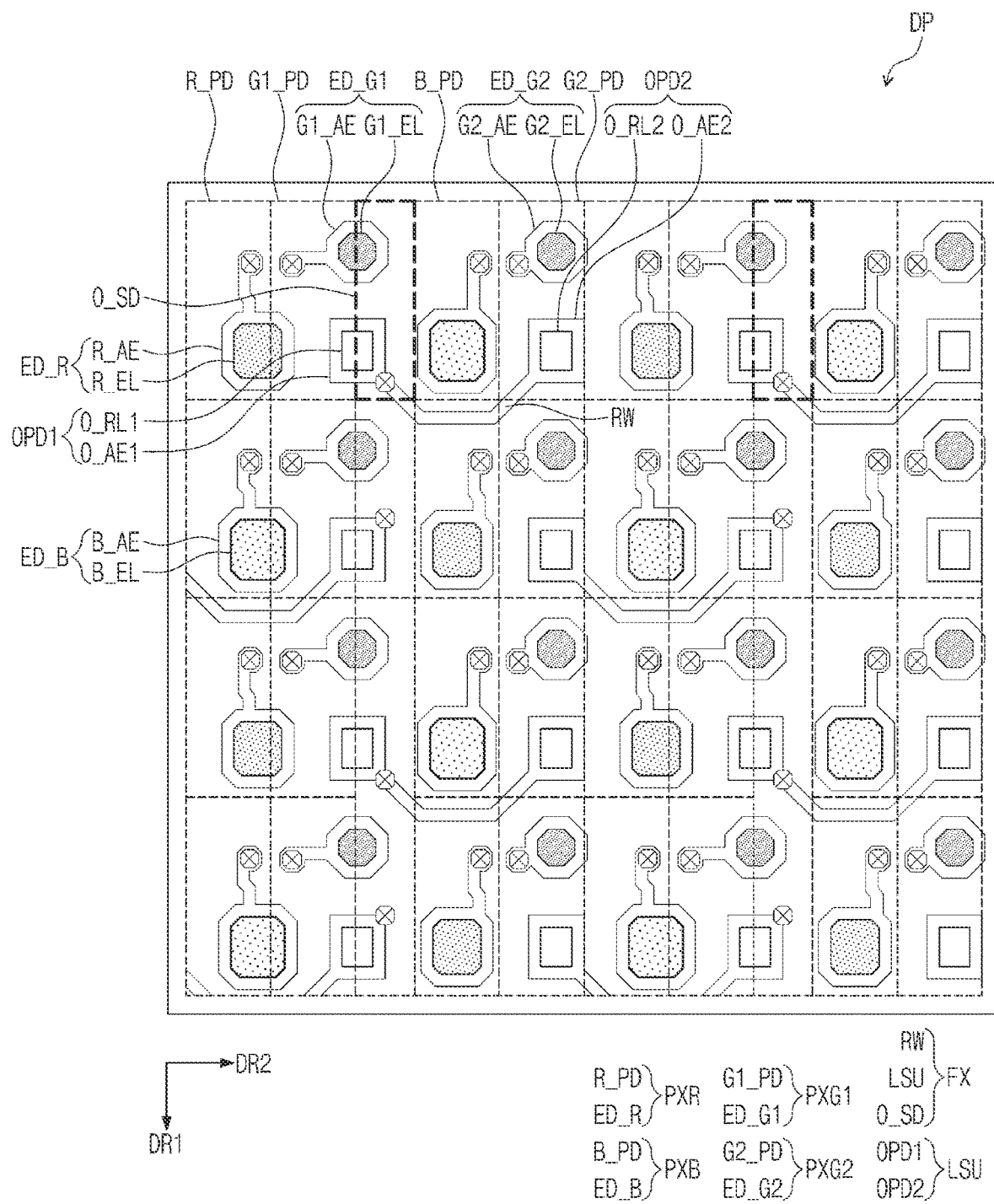
FIGS. 5A and 5B are schematic plan views illustrating a connection relationship between a light sensing unit and a sensor drive circuit according to embodiments.
Figure 5B:
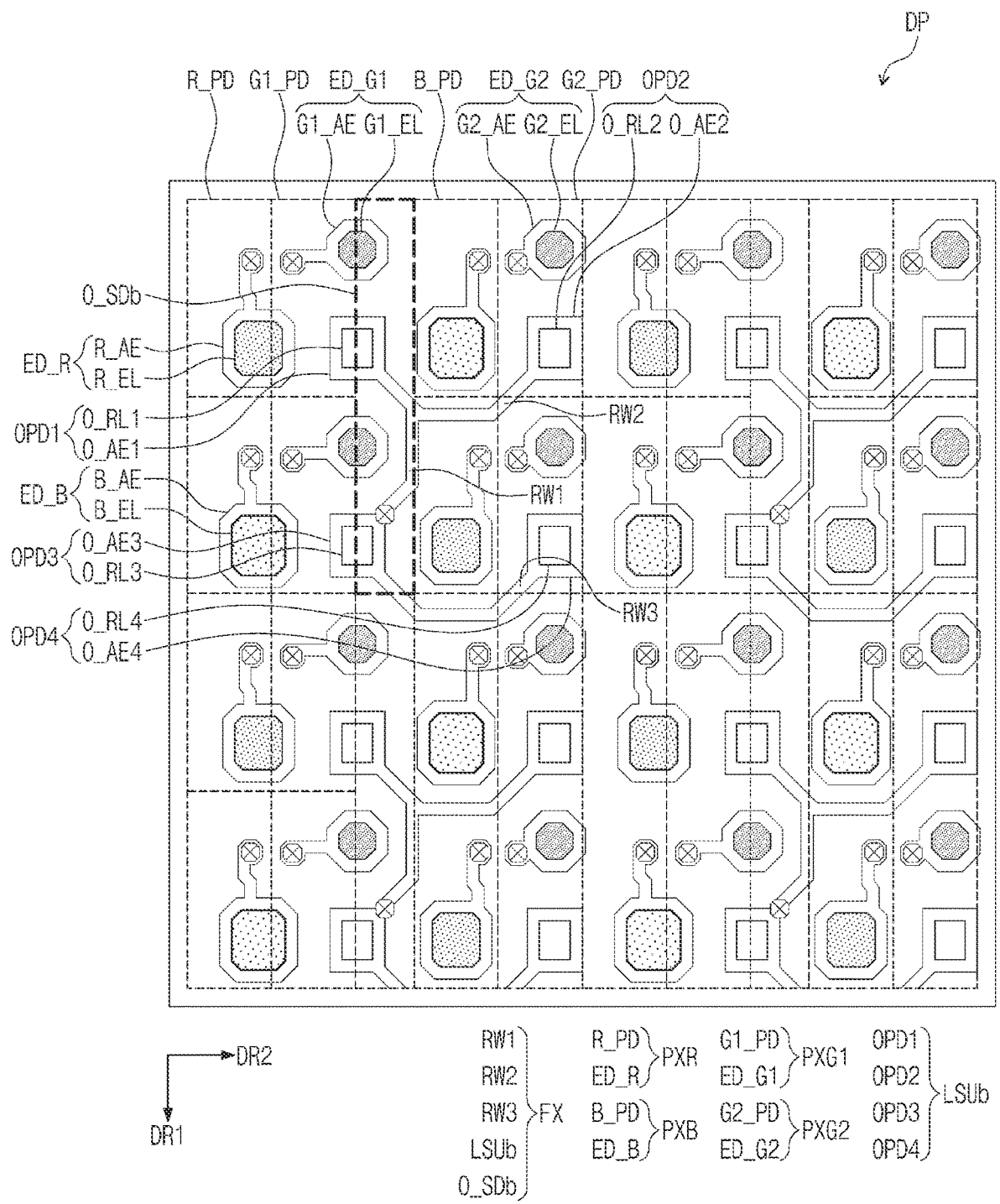

FIG. 4 is a schematic enlarged plan view of a partial area of the display panel according to an embodiment. FIGS. 5A and 5B are schematic plan views illustrating a connection relationship between a light sensing unit and a sensor drive circuit according to embodiments.

Referring to FIGS. 4, 5A, and 5B, the display panel DP may include pixels PXR, PXG1, PXG2, and PXB and sensors FX.

The pixels PXR, PXG1, PXG2, and PXB may be grouped into reference pixel units RPU. In an embodiment, each of the reference pixel units RPU may include four pixels, e.g., a first pixel PXR (hereinafter, referred to as a red pixel), two second pixels PXG1 and PXG2 (hereinafter, referred to as first and second green pixels), and a third pixel PXB (hereinafter, referred to as blue pixel). However, the number of the pixels included in each reference pixel unit RPU is not limited thereto. In another example, each reference pixel unit RPU may include three pixels, e.g., the red pixel PXR, the first green pixel PXG1 (or the second green pixel PXG2), and the blue pixel PXB.

The red pixel PXR may include a first light emitting element ED_R (hereinafter, referred to as a red light emitting element), the first and second green pixels PXG1 and PXG2 may include second light emitting elements ED_G1 and ED_G2 (hereinafter, referred to as first and second green light emitting elements), respectively, and the blue pixel PXB may include a third light emitting element ED_B (hereinafter, referred to as blue light emitting element). In an embodiment, the red light emitting element ED_R may output first color light (e.g., red light), the first and second green light emitting elements ED_G1 and ED_G2 may output second color light (e.g., green light), and the blue light emitting element ED_B may output third color light (e.g., blue light).

The red light emitting elements ED_R and the blue light emitting elements ED_B may be alternately and repeatedly disposed in the first and second directions DR1 and DR2. The first green light emitting elements ED_G1 may be arranged in the first direction DR1, and the second green light emitting elements ED_G2 may be arranged in the first direction DR1. The first green light emitting elements ED_G1 and the second green light emitting elements ED_G2 may be disposed in different columns. The first and second green light emitting elements ED_G1 and ED_G2 may be alternately arranged in the second direction DR2. The first and second green light emitting elements ED_G1 and ED_G2 may be disposed in different rows and columns from the red light emitting elements ED_R and the blue light emitting elements ED_B in the first and second directions DR1 and DR2.

In an embodiment, the red light emitting element ED_R may have a larger size than the first and second green light emitting elements ED_G1 and ED_G2. Furthermore, the blue light emitting element ED_B may have a size greater than or equal to the size of the red light emitting element ED_R. The sizes of the light emitting elements ED_R, ED_G1, ED_G2, and ED_B are not limited thereto and may be diversely modified. For example, in an embodiment, the light emitting elements ED_R, ED_G1, ED_G2, and ED_B may have the same size.

The first and second green light emitting elements ED_G1 and ED_G2 may have a different shape from the red and blue light emitting elements ED_R and ED_B. In an embodiment, each of the red and blue light emitting elements ED_R and ED_B may have an octagonal shape that is longer in the first direction DR1 than in the second direction DR2. For example, the red and blue light emitting elements ED_R and ED_B may have the same size or different sizes, but have the same shape.

Each of the first and second green light emitting elements ED_G1 and ED_G2 may have an octagonal shape having the same length in the first direction DR1 and the second direction DR2. In an embodiment, the first and second green light emitting elements ED_G1 and ED_G2 may have the same size and shape. However, the shapes of the light emitting elements ED_R, ED_G1, ED_G2, and ED_B are not limited thereto. The shapes of the light emitting elements ED_R, ED_G1, ED_G2, and ED_B may be diversely modified in the range in which the first and second green light emitting elements ED_G1 and ED_G2 have a different shape from the red and blue light emitting elements ED_R and ED_B.

The red light emitting element ED_R may include first and second sides R_S1 and R_S2 parallel to the first direction DR1, third and fourth sides R_S3 and R_S4 parallel to the second direction DR2, and first to fourth inclined sides R_CS1, R_CS2, R_CS3, and R_CS4 inclined with respect to the first and second directions DR1 and DR2. The first and second sides R_S1 and R_S2 may be longer than the third and fourth sides R_S3 and R_S4. However, embodiments are not limited thereto. In another example, in case that the red light emitting element ED_R has an octagonal shape that is longer in the second direction DR2 than in the first direction DR1, the third and fourth sides R_S3 and R_S4 may be longer than the first and second sides R_S1 and R_S2.

In the red light emitting element ED_R, the first to fourth inclined sides R_CS1, R_CS2, R_CS3, and R_CS4 may have the same length. In an embodiment, each of the first to fourth inclined sides R_CS1, R_CS2, R_CS3, and R_CS4 may have a curved shape.

The blue light emitting element ED_B may include first and second sides B_S1 and B_S2 parallel to the first direction DR1, third and fourth sides B_S3 and B_S4 parallel to the second direction DR2, and first to fourth inclined sides B_CS1, B_CS2, B_CS3, and B_CS4 inclined with respect to the first and second directions DR1 and DR2. The first and second sides B_S1 and B_S2 may be longer than the third and fourth sides B_S3 and B_S4. However, embodiments are not limited thereto. In another example, in case that the blue light emitting element ED_B has an octagonal shape that is longer in the second direction DR2 than in the first direction DR1, the third and fourth sides B_S3 and B_S4 may be longer than the first and second sides B_S1 and B_S2.

In the blue light emitting element ED_B, the first to fourth inclined sides B_CS1, B_CS2, B_CS3, and B_CS4 may have the same length. In an embodiment, each of the first to fourth inclined sides B_CS1, B_CS2, B_CS3, and B_CS4 may have a curved shape.

Each of the first and second green light emitting elements ED_G1 and ED_G2 may include first and second sides G_S1 and G_S2 parallel to the first direction DR1, third and fourth sides G_S3 and G_S4 parallel to the second direction DR2, and first to fourth inclined sides G_CS1, G_CS2, G_CS3, and G_CS4 inclined with respect to the first and second directions DR1 and DR2. In each of the first and second green light emitting elements ED_G1 and ED_G2, the first and second sides G_S1 and G_S2 may have the same length as the third and fourth sides G_S3 and G_S4. In each of the first and second green light emitting elements ED_G1 and ED_G2, the first to fourth inclined sides G_CS1, G_CS2, G_CS3, and G_CS4 may have the same length. In an embodiment, each of the first to fourth inclined sides G_CS1, G_CS2, G_CS3, and G_CS4 may have a curved shape.

Each of the sensors FX may include a light sensing unit LSU. The light sensing unit LSU may include at least one light sensing element. FIG. 4 illustrates one example that the light sensing unit LSU may include two light sensing elements (hereinafter, referred to as first and second light sensing elements OPD1 and OPD2). However, embodiments are not limited thereto. For example, the light sensing unit LSU may include one light sensing element, or may include four light sensing elements.

In an embodiment, the first and second light sensing elements OPD1 and OPD2 may be disposed to correspond to one reference pixel unit RPU. However, the number of light sensing elements disposed to correspond to each reference pixel unit RPU is not limited thereto. For example, one light sensing element may be disposed to correspond to each reference pixel unit RPU.

Each of the first and second light sensing elements OPD1 and OPD2 may be disposed between the red and blue light emitting elements ED_R and ED_B in the second direction DR2. The first and second light sensing elements OPD1 and OPD2 may be disposed adjacent to the first and second green light emitting elements ED_G1 and ED_G2 in the first direction DR1. For example, the first light sensing element OPD1 may be disposed between two first green light emitting elements ED_G1 adjacent to each other in the first direction DR1, and the second light sensing element OPD2 may be disposed between two second green light emitting elements ED_G2 adjacent to each other in the first direction DR1. The first and second light sensing elements OPD1 and OPD2 and the light emitting elements ED_R, ED_G1, ED_G2, and ED_B may be alternately disposed in the first and second directions DR1 and DR2.

The first and second light sensing elements OPD1 and OPD2 may have a smaller size than the red and blue light emitting elements ED_R and ED_B. In an embodiment, the first and second light sensing elements OPD1 and OPD2 may have a size that is the same as, or similar to, the sizes of the first and second green light emitting elements ED_G1 and ED_G2. However, the sizes of the first and second light sensing elements OPD1 and OPD2 are not limited thereto and may be diversely modified. The first and second light sensing elements OPD1 and OPD2 may have a different shape from the red and blue light emitting elements ED_R and ED_B. In an embodiment, the first and second light sensing elements OPD1 and OPD2 may have a rectangular shape.

Each of the first and second light sensing elements OPD1 and OPD2 may include first and second vertical sides VS1 and VS2 parallel to the first direction DR1, and first and second horizontal sides HS1 and HS2 parallel to the second direction DR2. The first and second vertical sides VS1 and VS2 may have a length smaller than or equal to the lengths of the first and second sides R_S1 and R_S2 of the red light emitting element ED_R, or may have a length smaller than or equal to the lengths of the first and second sides B_S1 and B_S2 of the blue light emitting element ED_B.

Referring to FIGS. 5A and 5B, each reference pixel unit RPU may include the red pixel PXR, the first and second green pixels PXG1 and PXG2, and the blue pixel PXB. The red pixel PXR may include the red light emitting element ED_R and a red pixel drive circuit R_PD, and the blue pixel PXB may include the blue light emitting element ED_B and a blue pixel drive circuit B_PD. The first green pixel PXG1 may include the first green light emitting element ED_G1 and a first green pixel drive circuit G1_PD, and the second green pixel PXG2 may include the second green light emitting element ED_G2 and a second green pixel drive circuit G2_PD.

The red light emitting element ED_R may be connected (e.g., electrically connected) to the red pixel drive circuit R_PD. For example, the red light emitting element ED_R may include a red anode electrode R_AE and a red light emitting layer R_EL, and the red anode electrode R_AE may be connected to the red pixel drive circuit R_PD through a contact hole. The first green light emitting element ED_G1 may be connected (e.g., electrically connected) to the first green pixel drive circuit G1_PD. For example, the first green light emitting element ED_G1 may include a first green anode electrode G1_AE and a first green light emitting layer G1_EL, and the first green anode electrode G1_AE may be connected to the first green pixel drive circuit G1_PD through a contact hole. The second green light emitting element ED_G2 may be connected (e.g., electrically connected) to the second green pixel drive circuit G2_PD. For example, the second green light emitting element ED_G2 may include a second green anode electrode G2_AE and a second green light emitting layer G2 EL, and the second green anode electrode G2_AE may be connected to the second green pixel drive circuit G2_PD through a contact hole. The blue light emitting element ED_B may be connected (e.g., electrically connected) to the blue pixel drive circuit B_PD. For example, the blue light emitting element ED_B may include a blue anode electrode B_AE and a blue light emitting layer B_EL, and the blue anode electrode B_AE may be connected to the blue pixel drive circuit B_PD through a contact hole.

Each of the sensors FX may include the light sensing unit LSU and a sensor drive circuit O_SD. In an embodiment, the light sensing unit LSU may include k light sensing elements, and at least one of the k light sensing elements may be connected to the sensor drive circuit O_SD. Here, k may be a natural number of 1 or larger. FIG. 5A illustrates one example that k is 2. In case that k is 2, the light sensing unit LSU may include two light sensing elements (hereinafter, referred to as the first and second light sensing elements OPD1 and OPD2). One of the first and second light sensing elements OPD1 and OPD2 (e.g., the first light sensing element OPD1) may be connected to the sensor drive circuit O_SD. The sensor drive circuit O_SD may have the same length as red and blue pixel drive circuits R_PD and B_PD in the first direction DR1.

The first light sensing element OPD1 may include a first anode electrode O_AE1 and a first photoelectric conversion layer O_RL1, and the second light sensing element OPD2 may include a second anode electrode O_AE2 and a second photoelectric conversion layer O_RL2. The first anode electrode O_AE1 may be connected (e.g., directly connected) to the sensor drive circuit O_SD through a contact hole.

Each of the sensors FX may further include a routing wire RW connecting (e.g., electrically connecting) the first and second light sensing elements OPD1 and OPD2. The routing wire RW may be connected (e.g., electrically connected) to the first anode electrode O_AE1 and the second anode electrode O_AE2. In an embodiment, the routing wire RW may be integral with the first anode electrode O_AE1 and the second anode electrode O_AE2.

The routing wire RW, the first anode electrode O_AE1, the second anode electrode O_AE2, and the anode electrodes R_AE, G1_AE, G2_AE, and B_AE may be disposed on the same layer. For example, the routing wire RW, the first anode electrode O_AE1, the second anode electrode O_AE2, and the anode electrodes R_AE, G1_AE, G2_AE, and B_AE may include the same material and may be formed by the same process.

The first and second light sensing elements OPD1 and OPD2 may be connected to the sensor drive circuit O_SD in parallel by the routing wires RW. Accordingly, the first and second light sensing elements OPD1 and OPD2 may be simultaneously turned on, or may be simultaneously turned off, by the sensor drive circuit O_SD.

In case that k is 4 as in FIG. 5B, a light sensing unit LSUb may include four light sensing elements (hereinafter, referred to as first to fourth light sensing elements OPD1, OPD2, OPD3, and OPD4). One of the first to fourth light sensing elements OPD1, OPD2, OPD3, and OPD4 (e.g., the third light sensing element OPD3) may be connected to a sensor drive circuit O_SDb.

Each of the sensors FX may further include three routing wires (hereinafter, referred to as first to third routing wires RW1, RW2, and RW3) that connect (e.g., electrically connect) the first to fourth light sensing elements OPD1, OPD2, OPD3, and OPD4. The first routing wire RW1 may connect (e.g., electrically connect) two light sensing elements (e.g., the first and third light sensing elements OPD1 and OPD3) adjacent to each other in the first direction DR1 among the four light sensing elements OPD1, OPD2, OPD3, and OPD4. The second routing wire RW2 may connect (e.g., electrically connect) two light sensing elements (e.g., the first and second light sensing elements OPD1 and OPD2) adjacent to each other in the second direction DR2 among the four light sensing elements OPD1, OPD2, OPD3, and OPD4. The third routing wire RW3 may connect (e.g., electrically connect) two light sensing elements (e.g., the third and fourth light sensing elements OPD3 and OPD4) adjacent to each other in the second direction DR2 among the four light sensing elements OPD1, OPD2, OPD3, and OPD4.

The first light sensing element OPD1 may include a first anode electrode O_AE1 and a first photoelectric conversion layer O_RL1, and the second light sensing element OPD2 may include a second anode electrode O_AE2 and a second photoelectric conversion layer O_RL2. The third light sensing element OPD3 may include a third anode electrode O_AE3 and a third photoelectric conversion layer O_RL3, and the fourth light sensing element OPD4 may include a fourth anode electrode O_AE4 and a fourth photoelectric conversion layer O_RL4. The third anode electrode O_AE3 may be connected (e.g., directly connected) to the sensor drive circuit O_SDb through a contact hole. In the first direction DR1, the sensor drive circuit O_SDb may be longer than the red and blue pixel drive circuits R_PD and B_PD. Accordingly, the sensor drive circuit O_SDb may overlap two light sensing elements (e.g., the first and third light sensing elements OPD1 and OPD3) among the first to fourth light sensing elements OPD1 to OPD4.

The first routing wire RW1 may be connected (e.g., electrically connected) to the first anode electrode O_AE1 and the third anode electrode O_AE3, and the second routing wire RW2 may be connected (e.g., electrically connected) to the first anode electrode O_AE1 and the second anode electrode O_AE2. The third routing wire RW3 may be connected (e.g., electrically connected) to the third anode electrode O_AE3 and the fourth anode electrode O_AE4. In an embodiment, the first to third routing wires RW1 to RW3 may be integral formed with the first to fourth anode electrodes O_AE1 to O_AE4.

The first to third routing wires RW1, RW2, and RW3, the first to fourth anode electrodes O_AE1 to O_AE4, and the anode electrodes R_AE, G1_AE, G2_AE, and B_AE may be disposed on the same layer. For example, the first to third routing wires RW1, RW2, and RW3, the first to fourth anode electrodes O_AE1 to O_AE4, and the anode electrodes R_AE, G1_AE, G2_AE, and B_AE may include the same material and may be formed by the same process.

The first to fourth light sensing elements OPD1, OPD2, OPD3, and OPD4 may be connected to the sensor drive circuit O_SDb in parallel by the first to third routing wires RW1, RW2, and RW3. Accordingly, the first to fourth light sensing elements OPD1, OPD2, OPD3, and OPD4 may be simultaneously turned on, or may be simultaneously turned off, by the sensor drive circuit O_SDb.

The sensor drive circuit O_SDb may include transistors. In an embodiment, the sensor drive circuit O_SDb and pixel drive circuits R_PD, G1_PD, G2_PD, and B_PD may be simultaneously formed by the same process. Furthermore, the scan driver 300 (refer to FIG. 3) may include transistors. For example, the transistors of the scan driver 300, the sensor drive circuit O_SDb, and the pixel drive circuits R_PD, G1_PD, G2_PD, and B_PD may be formed by the same process.

Although FIGS. 5A and 5B illustrate a structure in which two or more light sensing elements are provided for one sensor drive circuit, embodiments are not limited thereto. The disclosure may be applied to a structure in which one light sensing element is connected to one sensor drive circuit.

Figure 6A:
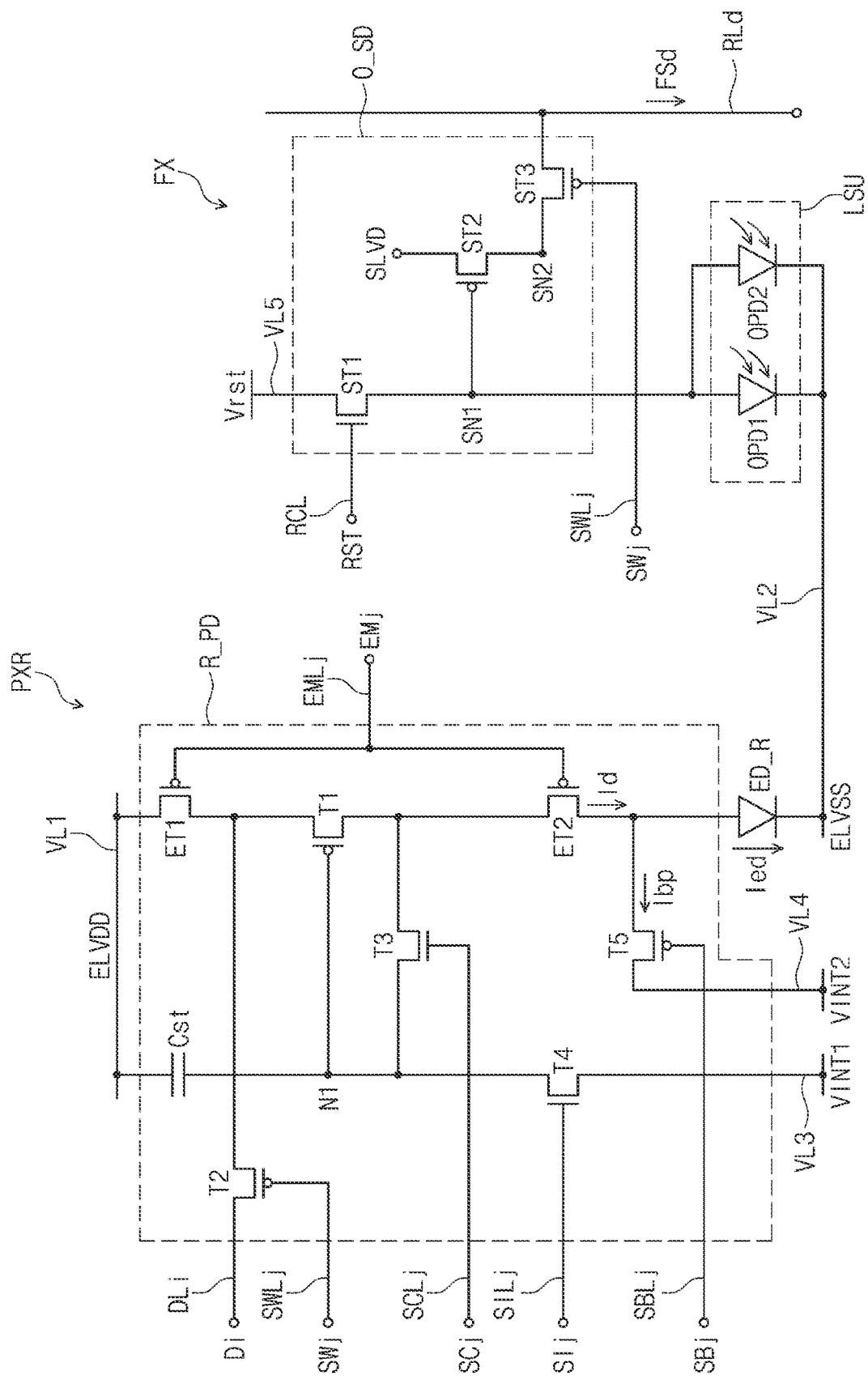
FIG. 6A is a circuit diagram illustrating a pixel and a sensor according to an embodiment.

FIG. 6A is a circuit diagram illustrating a pixel and a sensor according to an embodiment. FIG. 6B is a waveform diagram for describing operations of the pixel and the sensor illustrated in FIG. 6A.

FIG. 6A illustrates an equivalent circuit diagram of one pixel (e.g., the red pixel PXR) among the pixels PX illustrated in FIG. 3. The pixels PX may have the same circuit structure. Therefore, description of the circuit structure of the red pixel PXR may be applied to the remaining pixels, and detailed descriptions of the remaining pixels will be omitted for descriptive convenience. Furthermore, an equivalent circuit diagram of one sensor FX among the sensors FX illustrated in FIG. 3 is illustrated in FIG. 6A. The sensors FX may have the same circuit structure. Therefore, description of the circuit structure of the sensor FX may be applied to the remaining sensors, and detailed descriptions of the remaining sensors will be omitted for descriptive convenience.

Referring to FIG. 6A, the red pixel PXR may be connected to an i-th data line DLi among the data lines DL1 to DLm, a j-th initialization scan line SILj among the initialization scan lines SIL1 to SILn, a j-th compensation scan line SCLj among the compensation scan lines SCL1 to SCLn, a j-th write scan line SWLj among the write scan lines SWL1 to SWLn, a j-th black scan line SBLj among the black scan lines SBL1 to SBLn, and a j-th light emission control line EMLj among the light emission control lines EML1 to EMLn.

The red pixel PXR may include the red light emitting element ED_R and the red pixel drive circuit R_PD. The red light emitting element ED_R may be a light emitting diode. In an embodiment, the red light emitting element ED_R may be an organic light emitting diode including an organic light emitting layer.

The red pixel drive circuit R_PD may include first to fifth transistors T1, T2, T3, T4, and T5, first and second light emission control transistors ET1 and ET2, and one capacitor Cst. At least one of the first to fifth transistors T1, T2, T3, T4, and T5 and the first and second light emission control transistors ET1 and ET2 may be a transistor having a low-temperature polycrystalline silicon (LTPS) semiconductor layer. Some of the first to fifth transistors T1, T2, T3, T4, and T5 and the first and second light emission control transistors ET1 and ET2 may be P-type transistors, and the others may be N-type transistors. For example, the first, second, and fifth transistors T1, T2, and T5 and the first and second light emission control transistors ET1 and ET2 may be PMOS transistors, and the third and fourth transistors T3 and T4 may be NMOS transistors. At least one of the first to fifth transistors T1, T2, T3, T4, and T5 and the first and second light emission control transistors ET1 and ET2 may be a transistor having an oxide semiconductor layer. For example, the third and fourth transistors T3 and T4 may be oxide semiconductor transistors, and the first, second, and fifth transistors T1, T2, and T5 and the first and second light emission control transistors ET1 and ET2 may be LTPS transistors.

The configuration of the red pixel drive circuit R_PD according to embodiments are not limited to the embodiment illustrated in FIG. 6A. The red pixel drive circuit R_PD illustrated in FIG. 6A is illustrative, and various changes and modifications may be made to the configuration of the red pixel drive circuit R_PD. For example, the first to fifth transistors T1, T2, T3, T4, and T5 and the first and second light emission control transistors ET1 and ET2 may all be P-type transistors or N-type transistors.

The j-th initialization scan line SILj, the j-th compensation scan line SCLj, the j-th write scan line SWLj, the j-th black scan line SBLj, and the j-th light emission control line EMLj may transfer a j-th initialization scan signal SIj, a j-th compensation scan signal SCj, a j-th write scan signal SWj, a j-th black scan signal SBj, and a j-th light emission control signal EMj to the red pixel PXR, respectively. The i-th data line DLi transfers an i-th data signal Di to the red pixel PXR. The i-th data signal Di may have a voltage level corresponding to the image signal RGB (refer to FIG. 3) that is input to the display device DD (refer to FIG. 3).

A first drive voltage line VL1 and a second drive voltage line VL2 may transfer the first drive voltage ELVDD and the second drive voltage ELVSS to the red pixel PXR, respectively. Furthermore, a first initialization voltage line VL3 and a second initialization voltage line VL4 may transfer the first initialization voltage VINT1 and the second initialization voltage VINT2 to the red pixel PXR, respectively.

The first transistor T1 may be connected between the first drive voltage line VL1 receiving the first drive voltage ELVDD and the red light emitting element ED_R. The first transistor T1 may include a first electrode connected to the first drive voltage line VL1 via the first light emission control transistor ET1, a second electrode connected to the red anode electrode R_AE (refer to FIG. 5A) of the red light emitting element ED_R via the second light emission control transistor ET2, and a third electrode connected to an end of the capacitor Cst (e.g., a first node N1). The first transistor T1 may receive the i-th data signal Di that the i-th data line DLi transfers according to a switching operation of the second transistor T2 and may supply a drive current Id to the red light emitting element ED_R.

The second transistor T2 may be connected between the i-th data line DLi and the first electrode of the first transistor T1. The second transistor T2 may include a first electrode connected to the i-th data line DLi, a second electrode connected to the first electrode of the first transistor T1, and a third electrode connected to the j-th write scan line SWLj. The second transistor T2 may be turned on in response to the j-th write scan signal SWj transferred through the j-th write scan line SWLj and may transfer, to the first electrode of the first transistor T1, the i-th data signal Di transferred from the i-th data line DLi.

The third transistor T3 may be connected between the second electrode of the first transistor T1 and the first node N1. The third transistor T3 may include a first electrode connected to the third electrode of the first transistor T1, a second electrode connected to the second electrode of the first transistor T1, and a third electrode connected to the j-th compensation scan line SCLj. The third transistor T3 may be turned on in response to the j-th compensation scan signal SCj transferred through the j-th compensation scan line SCLj and may diode-connect the first transistor T1 by connecting the third electrode and the second electrode of the first transistor T1.

The fourth transistor T4 may be connected between the first initialization voltage line VL3, through which the first initialization voltage VINT1 is applied, and the first node N1. The fourth transistor T4 may include a first electrode connected to the first initialization voltage line VL3 through which the first initialization voltage VINT1 is transferred, a second electrode connected to the first node N1, and a third electrode connected to the j-th initialization scan line SILj. The fourth transistor T4 may be turned on in response to the j-th initialization scan signal SIj transferred through the j-th initialization scan line SILj. The turned-on fourth transistor T4 may initialize the potential of the third electrode of the first transistor T1 (e.g., the potential of the first node N1) by transferring the first initialization voltage VINT1 to the first node N1.

The first light emission control transistor ET1 may include a first electrode connected to the first drive voltage line VL1, a second electrode connected to the first electrode of the first transistor T1, and a third electrode connected to the j-th light emission control line EMLj.

The second light emission control transistor ET2 may include a first electrode connected to the second electrode of the first transistor T1, a second electrode connected to the red anode electrode RAE of the red light emitting element ED_R (refer to FIGS. 5A and 5B), and a third electrode connected to the j-th light emission control line EMLj.

The first and second light emission control transistors ET1 and ET2 may be simultaneously turned on in response to the j-th light emission control signal EMj transferred through the j-th light emission control line EMLj. The first drive voltage ELVDD applied through the turned-on first light emission control transistor ET1 may be compensated for through the diode-connected first transistor T1 and may be transferred to the red light emitting element ED_R.

The fifth transistor T5 may include a first electrode connected to the second initialization voltage line VL4 through which the second initialization voltage VINT2 is transferred, a second electrode connected to the second electrode of the second light emission control transistor ET2, and a third electrode connected to the j-th black scan line SBLj. The second initialization voltage VINT2 may have a voltage level lower than or equal to the voltage level of the first initialization voltage VINT1.

The end of the capacitor Cst may be connected to the third electrode of the first transistor T1 as described above, and an opposite end of the capacitor Cst may be connected to the first drive voltage line VL1. A cathode electrode of the red light emitting element ED_R may be connected to the second drive voltage line VL2 that transfers the second drive voltage ELVSS. The second drive voltage ELVSS may have a lower voltage level than the first drive voltage ELVDD. In an embodiment, the second drive voltage ELVSS may have a lower voltage level than the first and second initialization voltages VINT1 and VINT2.

Referring to FIGS. 6A and 6B, the j-th light emission control signal EMj may have a high level during a non-light emission period NEP. Within the non-light emission period NEP, the j-th initialization scan signal SIj may be activated.

In case that the j-th initialization scan signal SIj having a high level is provided through the j-th initialization scan line SILj during an activation period AP1 of the j-th initialization scan signal SIj (hereinafter, referred to as a first activation period), the fourth transistor T4 may be turned on in response to the j-th initialization scan signal SIj having the high level. The first initialization voltage VINT1 may be transferred to the third electrode of the first transistor T1 through the turned-on fourth transistor T4, and the first node N1 may be initialized to the first initialization voltage VINT1. Accordingly, the first activation period AP1 may be defined as an initialization period of the red pixel PXR.

For example, the j-th compensation scan signal SCj may be activated, and in case that the j-th compensation scan signal SCj having a high level is supplied through the j-th compensation scan line SCLj during an activation period AP2 of the j-th compensation scan signal SCj (hereinafter, referred to as a second activation period), the third transistor T3 may be turned on. The first transistor T1 may be diode-connected by the turned-on third transistor T3 and may be forward-biased. The first activation period AP1 may not overlap the second activation period AP2.

Within the second activation period AP2, the j-th write scan signal SWj may be activated. The j-th write scan signal SWj may have a low level during an activation period AP4 (hereinafter, referred to as a fourth activation period). During the fourth activation period AP4, the second transistor T2 may be turned on by the j-th write scan signal SWj having the low level. For example, a compensation voltage "Di-Vth" obtained by subtracting the threshold voltage Vth of the first transistor T1 from the i-th data signal Di supplied from the i-th data line DLi may be applied to the third electrode of the first transistor T1. For example, the potential of the third electrode of the first transistor T1 may be the compensation voltage "Di-Vth". The fourth activation period AP4 may overlap the second activation period AP2. The duration of the second activation period AP2 may be greater than the duration of the fourth activation period AP4.

The first drive voltage ELVDD and the compensation voltage "Di-Vth" may be applied to the opposite ends of the capacitor Cst, and charges corresponding to the difference between the voltages at the opposite ends of the capacitor Cst may be stored in the capacitor Cst. Here, the period during which the j-th compensation scan signal SCj has the high level may be referred to as a compensation period of the red pixel PXR.

For example, the j-th black scan signal SBj may be activated within the second activation period AP2 of the j-th compensation scan signal SCj. The j-th black scan signal SBj may have a low level during an activation period AP3 (hereinafter, referred to as a third activation period). During the third activation period AP3, the fifth transistor T5 may be turned on by receiving the j-th black scan signal SBj having the low level through the j-th black scan line SBLj. A portion of the drive current Id may escape (or flow) through the fifth transistor T5 as a bypass current Ibp. The third activation period AP3 may overlap the second activation period AP2. The duration of the second activation period AP2 may be greater than the duration of the third activation period AP3. The third activation period AP3 may precede the fourth activation period AP4 and may not overlap the fourth activation period AP4.

In case that the red pixel PXR displays a black image, the red pixel PXR may not normally display the black image in case that the red light emitting element ED_R emits light even though the minimum drive current of the first transistor T1 flows as the drive current Id. Accordingly, the fifth transistor T5 in the red pixel PXR according to an embodiment may distribute a portion of the minimum drive current of the first transistor T1 as the bypass current Ibp to a current path other than the current path toward the red light emitting element ED_R. Here, the minimum drive current of the first transistor T1 refers to a current flowing to the first transistor T1 under the condition that the gate-source voltage Vgs of the first transistor T1 is lower than the threshold voltage Vth so that the first transistor T1 may be turned off. The minimum drive current (e.g., a current of about 10 pA or less) flowing to the first transistor T1 under the condition that the first transistor T1 is turned off may be transferred to the red light emitting element ED_R, and a black gray-scale image is displayed. In case that the red pixel PXR displays a black image, an influence of the bypass current Ibp on the minimum drive current may be relatively great, whereas in case that the red pixel PXR displays an image such as a normal image or a white image, the bypass current Ibp may have little influence on the drive current Id. Accordingly, in case that the red pixel PXR displays a black image, a current obtained by subtracting the bypass current Ibp escaping (or flowing) through the fifth transistor T5 from the drive current Id (e.g., a light emission current Ied) may be provided to the red light emitting element ED_R so that the black image may be clearly expressed. Thus, the red pixel PXR may implement an accurate black gray-scale image using the fifth transistor T5. As a result, the contrast ratio may be improved.

After that, the j-th light emission control signal EMj supplied from the j-th light emission control line EMLj may be changed from the high level to a low level. The first and second light emission control transistors ET1 and ET2 may be turned on by the light emission control signal EMj having the low level. For example, the drive current Id according to the difference between the voltage of the third electrode of the first transistor T1 and the first drive voltage ELVDD may be generated, the drive current Id may be supplied to the red light emitting element ED_R through the second light emission control transistor ET2, and the current Ied may flow through the red light emitting element ED_R.

Referring again to FIG. 6A, the sensor FX may be connected to a d-th readout line RLd among the readout lines RL1 to RLh, the j-th write scan line SWLj, and a reset control line RCL.

The sensor FX may include the light sensing unit LSU and the sensor drive circuit O_SD. The light sensing unit LSU may include k light sensing elements connected in parallel. In case that k is 2, the first and second light sensing elements OPD1 and OPD2 may be connected to each other in parallel. Each of the first and second light sensing elements OPD1 and OPD2 may be a photo diode. In an embodiment, each of the first and second light sensing elements OPD1 and OPD2 may be an organic photo diode that includes an organic material as a photoelectric conversion layer. The first and second anode electrodes O_AE1 and O_AE2 (refer to FIG. 5A) of the first and second light sensing elements OPD1 and OPD2 may be connected to a first sensing node SN1, and first and second cathodes of the first and second light sensing elements OPD1 and OPD2 may be connected to the second drive voltage line VL2 that transfers the second drive voltage ELVSS.

The sensor drive circuit O_SD may include three transistors ST1, ST2, and ST3. The three transistors ST1, ST2, and ST3 may include a reset transistor ST1, an amplifying transistor ST2, and an output transistor ST3. At least one of the reset transistor ST1, the amplifying transistor ST2, and the output transistor ST3 may be an oxide semiconductor transistor. In an embodiment, the reset transistor ST1 may be an oxide semiconductor transistor, and the amplifying transistor ST2 and the output transistor ST3 may be LTPS transistors. However, embodiments are not limited thereto, at least the reset transistor ST1 and the output transistor ST3 may be oxide semiconductor transistors, and the amplifying transistor ST2 may be an LTPS transistor.

Furthermore, some of the reset transistor ST1, the amplifying transistor ST2, and the output transistor ST3 may be P-type transistors, and the remaining may be an N-type transistor. In an embodiment, the amplifying transistor ST2 and the output transistor ST3 may be PMOS transistors, and the reset transistor ST1 may be an NMOS transistor. However, embodiments are not limited thereto, the reset transistor ST1, the amplifying transistor ST2, and the output transistor ST3 may all be N-type transistors or P-type transistors.

Some of the reset transistor ST1, the amplifying transistor ST2, and the output transistor ST3 (e.g., the reset transistor ST1) may be of the same type as the third and fourth transistors T3 and T4 of the red pixel PXR. The amplifying transistor ST2 and the output transistor ST3 may be transistors of the same type as the first, second, and fifth transistors T1, T2, and T5 and the first and second light emission control transistors ET1 and ET2 of the red pixel PXR.

A circuit configuration of the sensor drive circuit O_SD according to embodiments are not limited to that illustrated in FIG. 6A. The sensor drive circuit O_SD illustrated in FIG. 6A is illustrative, and various changes and modifications may be made to the configuration of the sensor drive circuit O_SD.

The reset transistor ST1 may include a first electrode connected to a reset control line RCL that receives a reset voltage Vrst, a second electrode connected to the first sensing node SN1, and a third electrode connected to the reset control line RCL that receives a reset control signal RST. In response to the reset control signal RST, the reset transistor ST1 may reset the potential of the first sensing node SN1 to the reset control signal RST. The reset control signal RST may be a signal provided through the reset control line RCL. However, embodiments are not limited thereto. In another example, the reset control signal RST may be the j-th compensation scan signal SCj supplied through the j-th compensation scan line SCLj. For example, the reset transistor ST1 may receive the j-th compensation scan signal SCj, which is supplied from the j-th compensation scan line SCLj, as the reset control signal RST. In an embodiment, the reset voltage Vrst may have a lower voltage level than the second drive voltage ELVSS at least during an activation period of the reset control signal RST. The reset voltage Vrst may be a DC voltage maintained at a lower voltage level than the second drive voltage ELVSS.

The reset transistor ST1 may include sub-reset transistors connected in series. For example, the reset transistor ST1 may include two sub-reset transistors (hereinafter, referred to as the first and second sub-reset transistors). For example, a third electrode of the first sub-reset transistor and a third electrode of the second sub-reset transistor may be connected to the reset control line RCL. Furthermore, a second electrode of the first sub-reset transistor and a first electrode of the second sub-reset transistor may be connected (e.g., electrically connected) to each other. For example, the reset control signal RST may be applied to a first electrode of the first sub-reset transistor, and a second electrode of the second sub-reset transistor may be connected (e.g., electrically connected) to the first sensing node SN1. However, the number of sub-reset transistors is not limited thereto and may be diversely modified.

The amplifying transistor ST2 may include a first electrode that receives a sensing drive voltage SLVD, a second electrode connected to a second sensing node SN2, and a third electrode connected to the first sensing node SN1. The amplifying transistor ST2 may be turned on according to the potential of the first sensing node SN1 and may apply the sensing drive voltage SLVD to the second sensing node SN2. In an embodiment, the sensing drive voltage SLVD may be one of the first drive voltage ELVDD and the first and second initialization voltages VINT1 and VINT2. In case that the sensing drive voltage SLVD is the first drive voltage ELVDD, the first electrode of the amplifying transistor ST2 may be connected (e.g., electrically connected) to the first drive voltage line VL1. In case that the sensing drive voltage SLVD is the first initialization voltage VINT1, the first electrode of the amplifying transistor ST2 may be connected (e.g., electrically connected) to the first initialization voltage line VL3, and in case that the sensing drive voltage SLVD is the second initialization voltage VINT2, the first electrode of the amplifying transistor ST2 may be connected (e.g., electrically connected) to the second initialization voltage line VL4.

The output transistor ST3 may include a first electrode connected to the second sensing node SN2, a second electrode connected to the d-th readout line RLd, and a third electrode that receives an output control signal. In response to the output control signal, the output transistor ST3 may transfer a readout signal FSd to the d-th readout line RLd. The output control signal may be the j-th write scan signal SWj supplied through the j-th write scan line SWLj. For example, the output transistor ST3 may receive the j-th write scan signal SWj, which is supplied from the j-th write scan line SWLj, as the output control signal.

The light sensing unit LSU of the sensor FX may be exposed to light during light emission periods of the light emitting elements ED_R, ED_G1, ED_G2, and ED_B. The light may be light output from one of the light emitting elements ED_R, ED_G1, ED_G2, and ED_B.

In case that the user's hand US_F (refer to FIG. 1) touches the display surface, the first and second light sensing elements OPD1 and OPD2 may generate photo-charges corresponding to light reflected by ridges of a fingerprint or valleys between the ridges, and the generated photo-charges may be accumulated in the first sensing node SN1.

The amplifying transistor ST2 may be a source follower amplifier that generates a source-drain current in proportion to the amount of charge of the first sensing node SN1 that is input to the third electrode.

During the fourth activation period AP4, the j-th write scan signal SWj having a low level may be supplied to the output transistor ST3 through the j-th write scan line SWLj. In case that the output transistor ST3 is turned on in response to the j-th write scan signal SWj having the low level, the readout signal FSd corresponding to a current flowing through the amplifying transistor ST2 may be output to the d-th readout line RLd.

In case that the reset control signal RST having a high level is supplied through the reset control line RCL during a reset period, the reset transistor ST1 may be turned on. The reset period may be defined as an activation period (e.g., a high-level period) of the reset control line RCL. In another example, in case that the reset transistor ST1 is implemented with a PMOS transistor, the reset control signal RST having a low level may be supplied to the reset control line RCL during the reset period. During the reset period, the first sensing node SN1 may be reset to a potential corresponding to the reset voltage Vrst. In an embodiment, the reset voltage Vrst may have a lower voltage level than the second drive voltage ELVSS.

In case that the reset period ends, the light sensing unit LSU may generate photo-charges corresponding to received light, and the generated photo-charges may be accumulated in the first sensing node SN1.

FIGS. 7A to 7D are schematic enlarged plan views of a partial area of the display panel according to embodiments. Among the components illustrated in FIGS. 7A to 7D, components identical to the components illustrated in FIG. 4 will be assigned with identical reference numerals, and specific descriptions thereabout will be omitted for descriptive convenience.

Figure 7A:
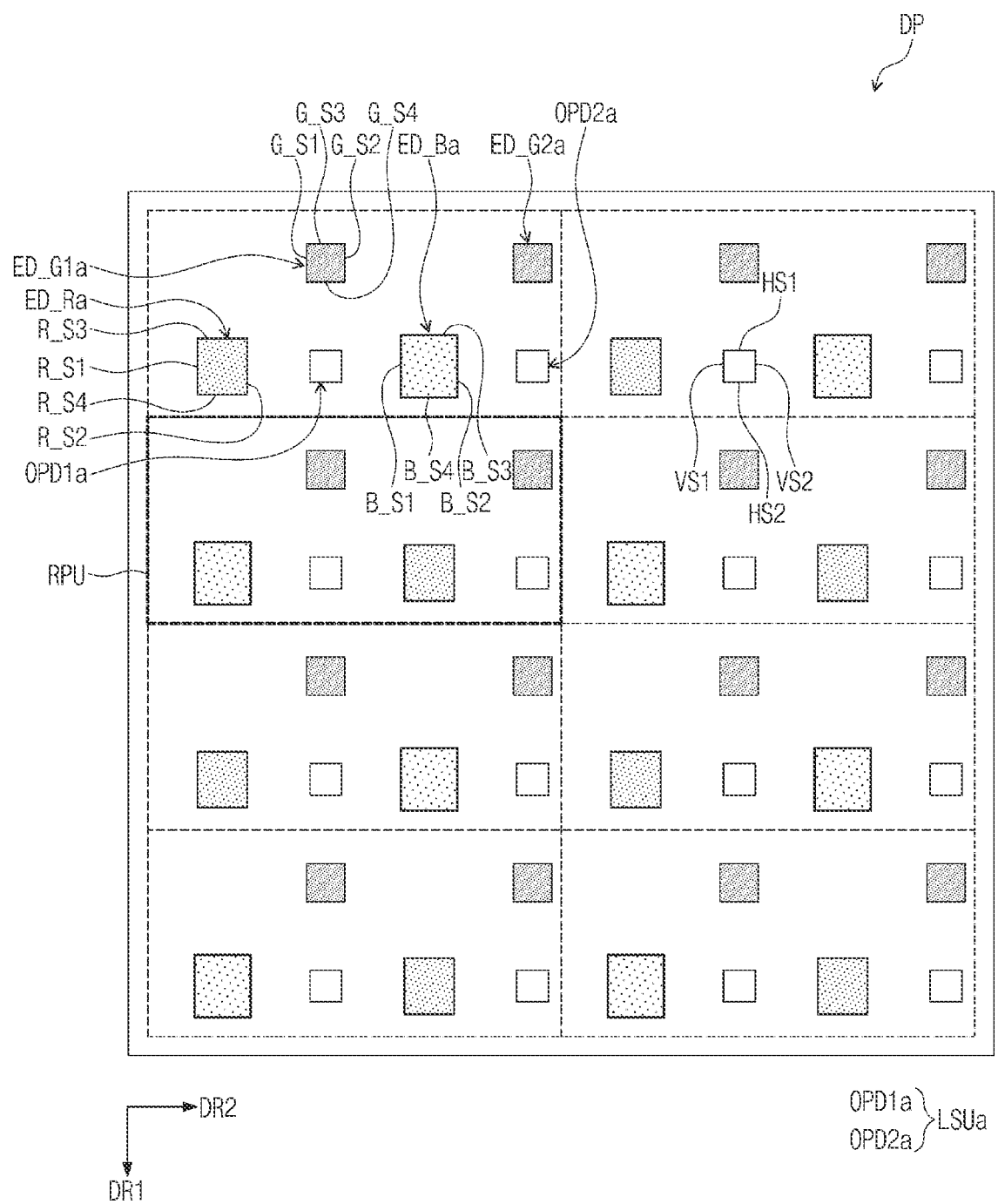
FIGS. 7A to 7D are schematic enlarged plan views of a partial area of the display panel according to embodiments.

Referring to FIG. 7A, in the display panel DP according to an embodiment, red and blue light emitting elements ED_Ra and ED_Ba may have a rectangular shape, and first and second green light emitting elements ED_G1a and ED_G2a may have a square shape. In FIG. 7A, the red and blue light emitting elements ED_Ra and ED_Ba may have a rectangular shape longer in the first direction DR1 than in the second direction DR2. In another example, the red and blue light emitting elements ED_Ra and ED_Ba may have a rectangular shape longer in the second direction DR2 than in the first direction DR1.

The first and second green light emitting elements ED_G1a and ED_G2a may have a different shape from the red and blue light emitting elements ED_Ra and ED_Ba. In an embodiment, the first and second green light emitting elements ED_G1a and ED_G2a may have a square shape having the same length in the first direction DR1 and the second direction DR2. However, the shapes of the light emitting elements ED_Ra, ED_G1a, ED_G2a, and ED_Ba are not limited thereto. The shapes of the light emitting elements ED_Ra, ED_G1a, ED_G2a, and ED_Ba may be diversely modified in the range in which the first and second green light emitting elements ED_G1a and ED_G2a have a different shape from the red and blue light emitting elements ED_Ra and ED_Ba.

The red light emitting element ED_Ra may include first and second sides R_S1 and R_S2 parallel to the first direction DR1 and third and fourth sides R_S3 and R_S4 parallel to the second direction DR2. The first and second sides R_S1 and R_S2 may be longer than the third and fourth sides R_S3 and R_S4. However, embodiments are not limited thereto. In another example, in case that the red light emitting element ED_Ra has a rectangular shape longer in the second direction DR2 than in the first direction DR1, the third and fourth sides R_S3 and R_S4 may be longer than the first and second sides R_S1 and R_S2.

The blue light emitting element ED_Ba may include first and second sides B_S1 and B_S2 parallel to the first direction DR1 and third and fourth sides B_S3 and B_S4 parallel to the second direction DR2. The first and second sides B_S1 and B_S2 may be longer than the third and fourth sides B_S3 and B_S4. However, embodiments are not limited thereto. In another example, in case that the blue light emitting element ED_Ba has a rectangular shape longer in the second direction DR2 than in the first direction DR1, the third and fourth sides B_S3 and B_S4 may be longer than the first and second sides B_S1 and B_S2.

In case that the blue light emitting element ED_Ba has a larger size than the red light emitting element ED_Ra, the first and second sides B_S1 and B_S2 of the blue light emitting element ED_Ba may be longer than the first and second sides R_S1 and R_S2 of the red light emitting element ED_Ra, and the third and fourth sides B_S3 and B_S4 of the blue light emitting element ED_Ba may be longer than the third and fourth sides R_S3 and R_S4 of the red light emitting element ED_Ra.

Each of the first and second green light emitting elements ED_G1a and ED_G2a may include first and second sides G_S1 and G_S2 parallel to the first direction DR1 and third and fourth sides G_S3 and G_S4 parallel to the second direction DR2. In each of the first and second green light emitting elements ED_G1a and ED_G2a, the first and second sides G_S1 and G_S2 may have the same length as the third and fourth sides G_S3 and G_S4.

Each of the sensors FX (refer to FIG. 5A) may include a light sensing unit LSUa. The light sensing unit LSUa may include at least one light sensing element. FIG. 7A illustrates one example that the light sensing unit LSUa may include two light sensing elements (hereinafter, referred to as first and second light sensing elements OPD1a and OPD2a). However, embodiments are not limited thereto. For example, the light sensing unit LSUa may include one light sensing element, or may include four light sensing elements.

In an embodiment, the first and second light sensing elements OPD1a and OPD2a may be disposed to correspond to one reference pixel unit RPU. However, the number of light sensing elements disposed to correspond to each reference pixel unit RPU is not limited thereto. For example, one light sensing element may be disposed to correspond to each reference pixel unit RPU.

The first and second light sensing elements OPD1a and OPD2a may have a different shape from the red and blue light emitting elements ED_Ra and ED_Ba. In an embodiment, the first and second light sensing elements OPD1a and OPD2a may have a square shape.

Each of the first and second light sensing elements OPD1a and OPD2a may include first and second vertical sides VS1 and VS2 parallel to the first direction DR1 and first and second horizontal sides HS1 and HS2 parallel to the second direction DR2. In an embodiment, the first and second vertical sides VS1 and VS2 may have the same length as the first and second horizontal sides HS1 and HS2. The first and second vertical sides VS1 and VS2 and the first and second horizontal sides HS1 and HS2 may have a length smaller than or equal to the lengths of the first to fourth sides R_S1 to R_S4 and B_S1 to B_S4 of the red and blue light emitting elements ED_Ra and ED_Ba.

In another example, in case that the first and second light sensing elements OPD1a and OPD2a have a square shape, the red and blue light emitting elements ED_Ra and ED_Ba may have an octagonal shape long in the first direction DR1 or the second direction DR2.

Figure 7B:
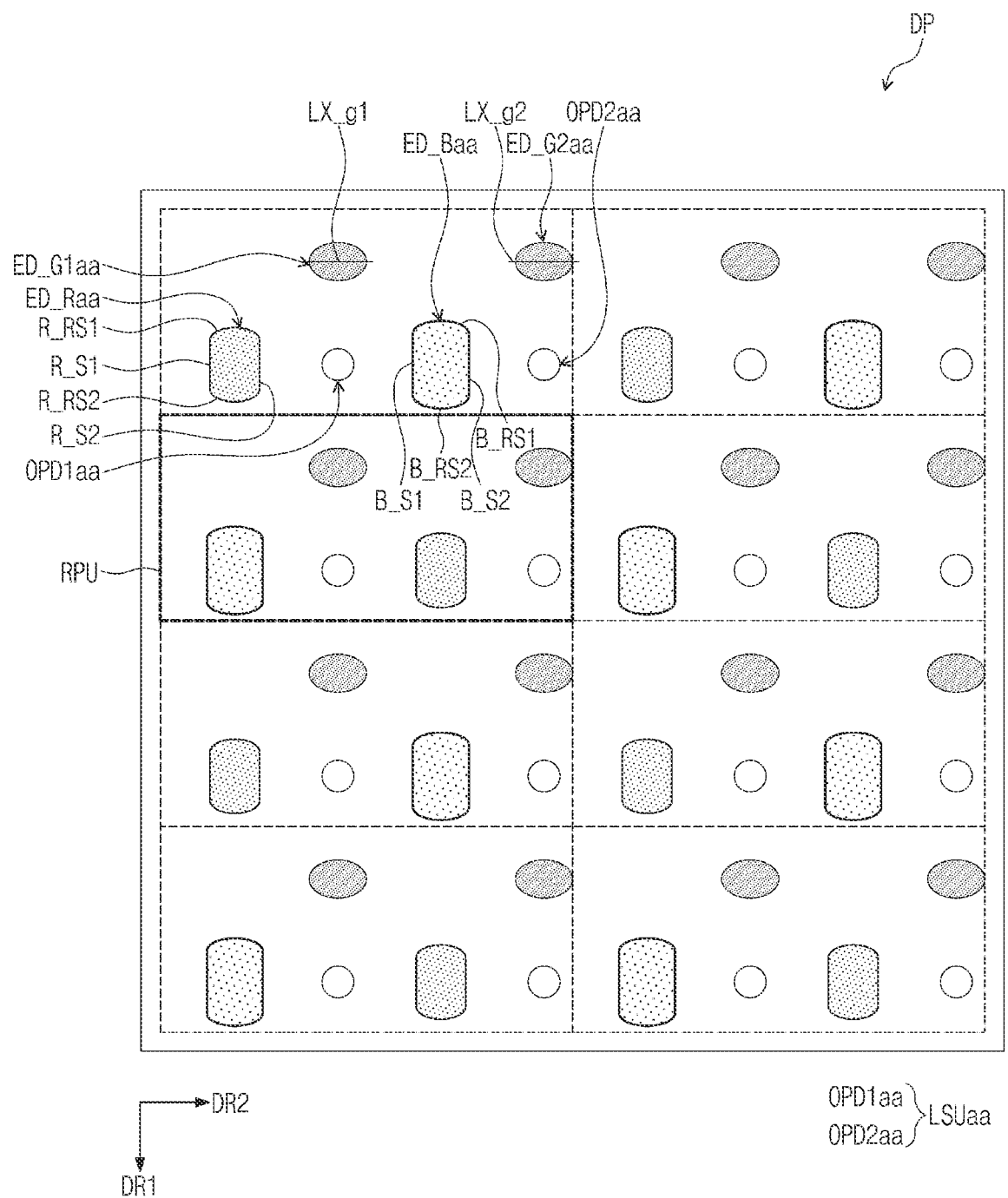

Referring to FIG. 7B, in the display panel DP according to an embodiment, one side of each of red and blue light emitting elements ED_Raa and ED_Baa may have a round shape. In FIG. 7B, the red light emitting element ED_Raa may include first and second sides R_S1 and R_S2 having a linear shape parallel to the first direction DR1 and third and fourth sides R_RS1 and R_RS2 having a round shape. Although the third and fourth sides R_RS1 and R_RS2 have a round shape, embodiments are not limited thereto. For example, only one of the third and fourth sides R_RS1 and R_RS2 (e.g., the fourth side R_RS2) may have a round shape, and the other side (e.g., the third side R_RS1) may have a linear shape parallel to the second direction DR2.

The blue light emitting element ED_Baa may include first and second sides B_S1 and B_S2 having a linear shape parallel to the first direction DR1 and third and fourth sides B_RS1 and B_RS2 having a round shape. Although the third and fourth sides B_RS1 and B_RS2 have a round shape, embodiments are not limited thereto. For example, only one of the third and fourth sides B_RS1 and B_RS2 (e.g., the fourth side B_RS2) may have a round shape, and the other side (e.g., the third side B_RS1) may have a linear shape parallel to the second direction DR2.

First and second green light emitting elements ED_G1aa and ED_G2aa may have a different shape from the red and blue light emitting elements ED_Raa and ED_Baa. In an embodiment, the first and second green light emitting elements ED_G1aa and ED_G2aa may have an oval shape. The first green light emitting element ED_G1aa may have a first minor axis parallel to the first direction DR1 and a first major axis LX_g1 parallel to the second direction DR2. The second green light emitting element ED_G2aa may have a second minor axis parallel to the first direction DR1 and a second major axis LX_g2 parallel to the second direction DR2. The first and second minor axes may have the same length, and the first and second major axes LX_g1 and LX_g2 may have the same length.

In another example, the first and second green light emitting elements ED_G1aa and ED_G2aa may have a circular shape. However, the shapes of the light emitting elements ED_Raa, ED_G1aa, ED_G2aa, and ED_Baa are not limited thereto. The shapes of the light emitting elements ED_Raa, ED_G1aa, ED_G2aa, and ED_Baa may be diversely modified in the range in which the first and second green light emitting elements ED_G1aa and ED_G2aa have a different shape from the red and blue light emitting elements ED_Raa and ED_Baa.

Each of the sensors FX (refer to FIG. 5A) may include a light sensing unit LSUaa. The light sensing unit LSUaa may include first and second light sensing elements OPD1aa and OPD2aa. The first and second light sensing elements OPD1aa and OPD2aa may have a different shape from the red and blue light emitting elements ED_Raa and ED_Baa. In an embodiment, the first and second light sensing elements OPD1aa and OPD2aa may have a circular shape.

Figure 7C:
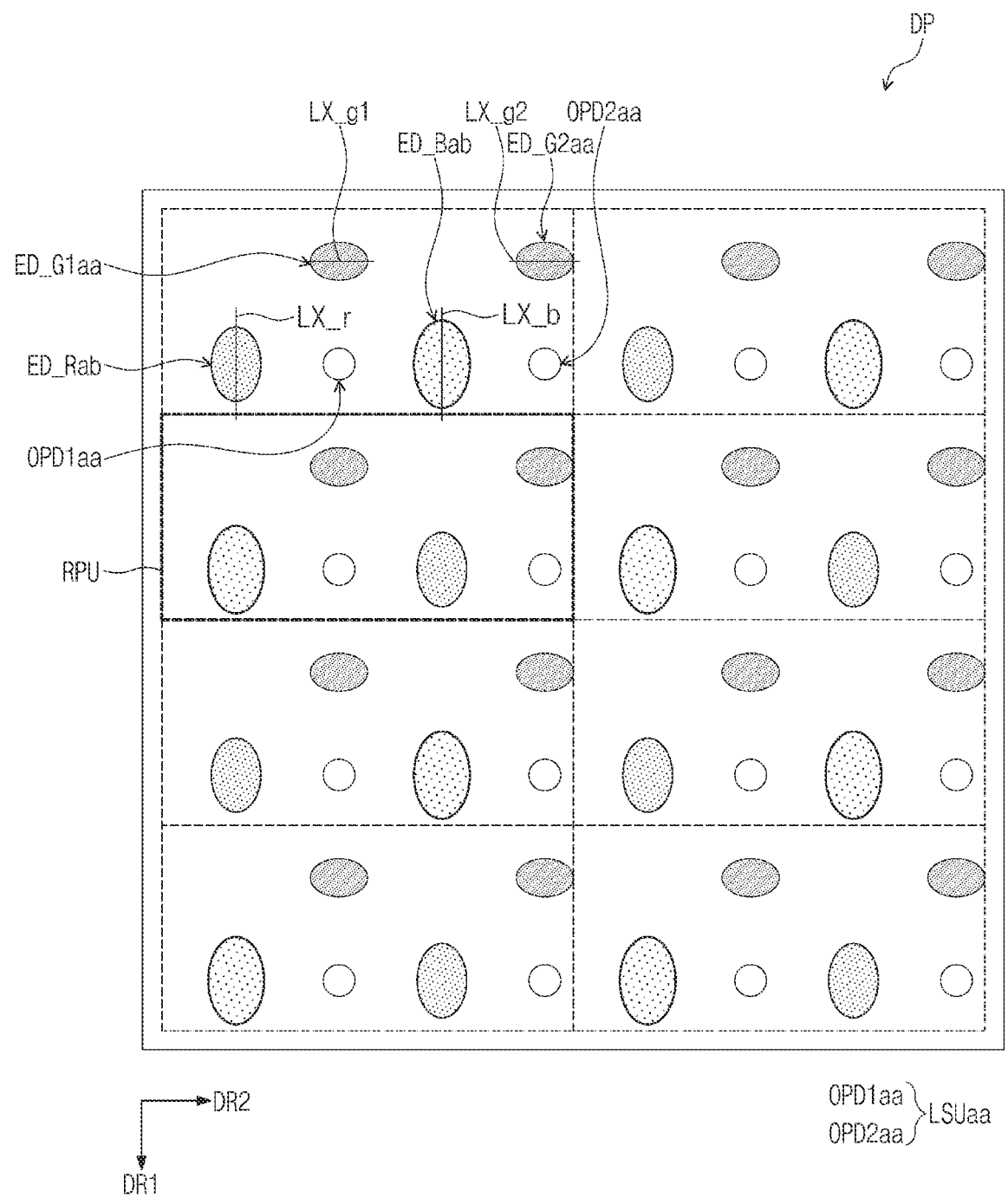

Referring to FIG. 7C, in the display panel DP according to an embodiment, red and blue light emitting elements ED_Rab and ED_Bab may have an oval shape. In FIG. 7C, the red light emitting element ED_Rab may have a red minor axis parallel to the second direction DR2 and a red major axis LX_r parallel to the first direction DR1. The blue light emitting element ED_Bab may have a blue minor axis parallel to the second direction DR2 and a blue major axis LX_b parallel to the first direction DR1. In an embodiment, the red minor axis may have a different length from the blue minor axis, and the red major axis LX_r may have a different length from the blue major axis LX_b. For example, the length of the blue major axis LX_b may be greater than the length of the red major axis LX_r.

First and second green light emitting elements ED_G1aa and ED_G2aa may have an oval shape. In an embodiment, the first green light emitting element ED_G1aa may have a first minor axis parallel to the first direction DR1 and a first major axis LX_g1 parallel to the second direction DR2. The second green light emitting element ED_G2aa may have a second minor axis parallel to the first direction DR1 and a second major axis LX_g2 parallel to the second direction DR2. The first and second minor axes may have the same length, and the first and second major axes LX_g1 and LX_g2 may have the same length. The first and second major axes LX_g1 and LX_g2 may cross the red and blue major axes LX_r and LX_b. Although FIG. 7C illustrates the structure in which the first and second major axes LX_g1 and LX_g2 cross the red and blue major axes LX_r and LX_b at right angles, embodiments are not limited thereto.

Figure 7D:
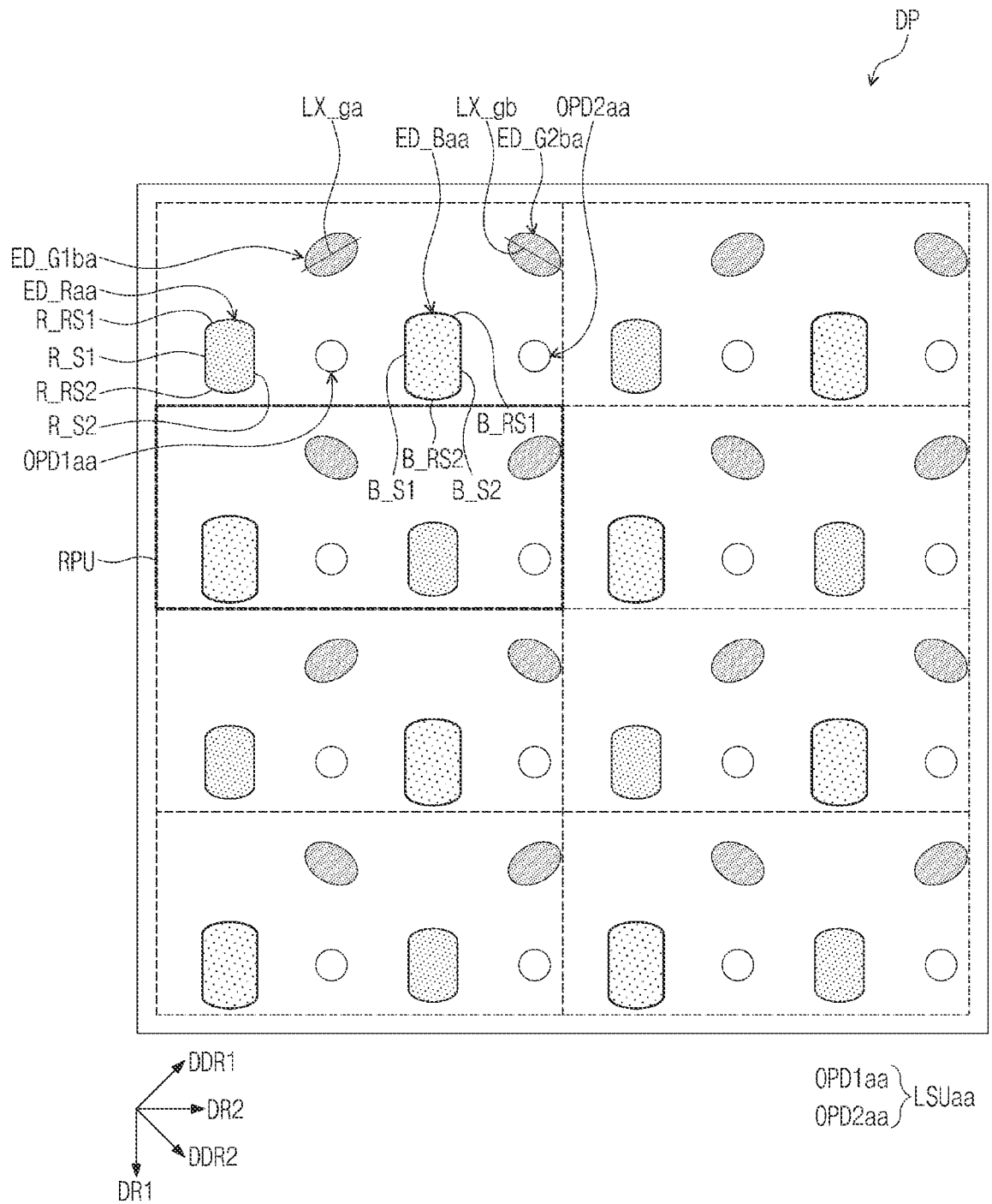

Referring to FIG. 7D, in the display panel DP according to an embodiment, one side of each of red and blue light emitting elements ED_Raa and ED_Baa may have a round shape. In FIG. 7D, the red light emitting element ED_Raa may include first and second sides R_S1 and R_S2 having a linear shape parallel to the first direction DR1 and third and fourth sides R_RS1 and R_RS2 having a round shape. The blue light emitting element ED_Baa may include first and second sides B_S1 and B_S2 having a linear shape parallel to the first direction DR1 and third and fourth sides B_RS1 and B_RS2 having a round shape.

First and second green light emitting elements ED_G1ba and ED_G2ba may have an oval shape. In an embodiment, the first green light emitting element ED_G1ba may have a first major axis LX_ga parallel to a first diagonal direction DDR1 and a first minor axis parallel to a second diagonal direction DDR2. The first and second diagonal directions DDR1 and DDR2 may cross the first and second directions DR1 and DR2, and the first and second diagonal directions DDR1 and DDR2 may cross each other at a right angle. The second green light emitting element ED_G2ba may have a second major axis LX_gb parallel to the second diagonal direction DDR2 and a second minor axis parallel to the first diagonal direction DDR1. The first and second minor axes may have the same length, and the first and second major axes LX_ga and LX_gb may have the same length. The first and second minor axes may cross each other at a right angle, and the first and second major axes LX_ga and LX_gb may cross each other at a right angle.

In another example, in case that the red and blue light emitting elements ED_Rab and ED_Bab have an oval shape as illustrated in FIG. 7C, the first and second major axes LX_ga and LX_gb may cross the red and blue major axes LX_r and LX_b. For example, the first and second major axes LX_ga and LX_gb may cross the red and blue major axes LX_r and LX_b at an angle smaller than about 90 degrees and larger than about 0 degrees.

Figure 8A:
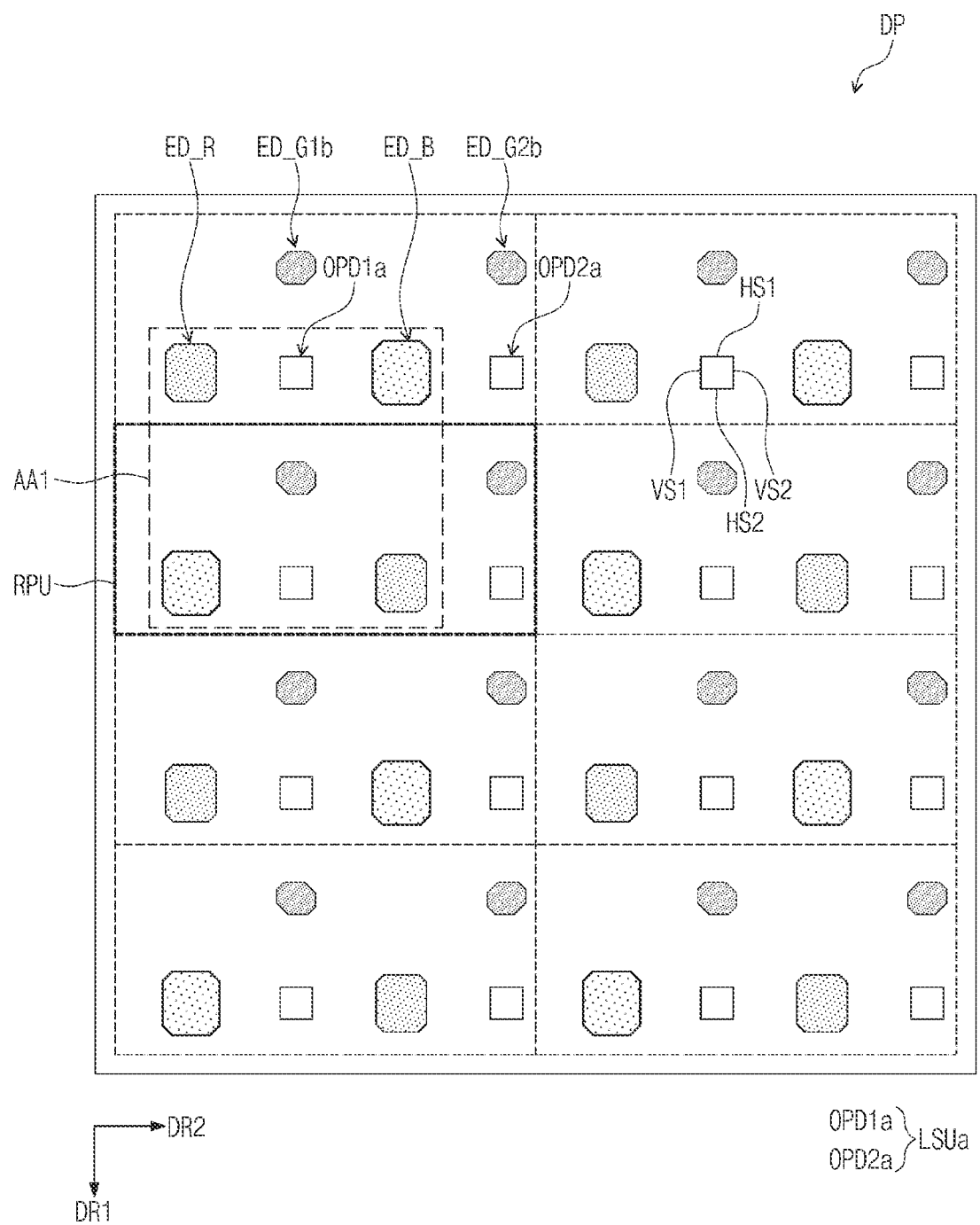
FIG. 8A is a schematic enlarged plan view of a partial area of the display panel according to an embodiment.
Figure 8B:
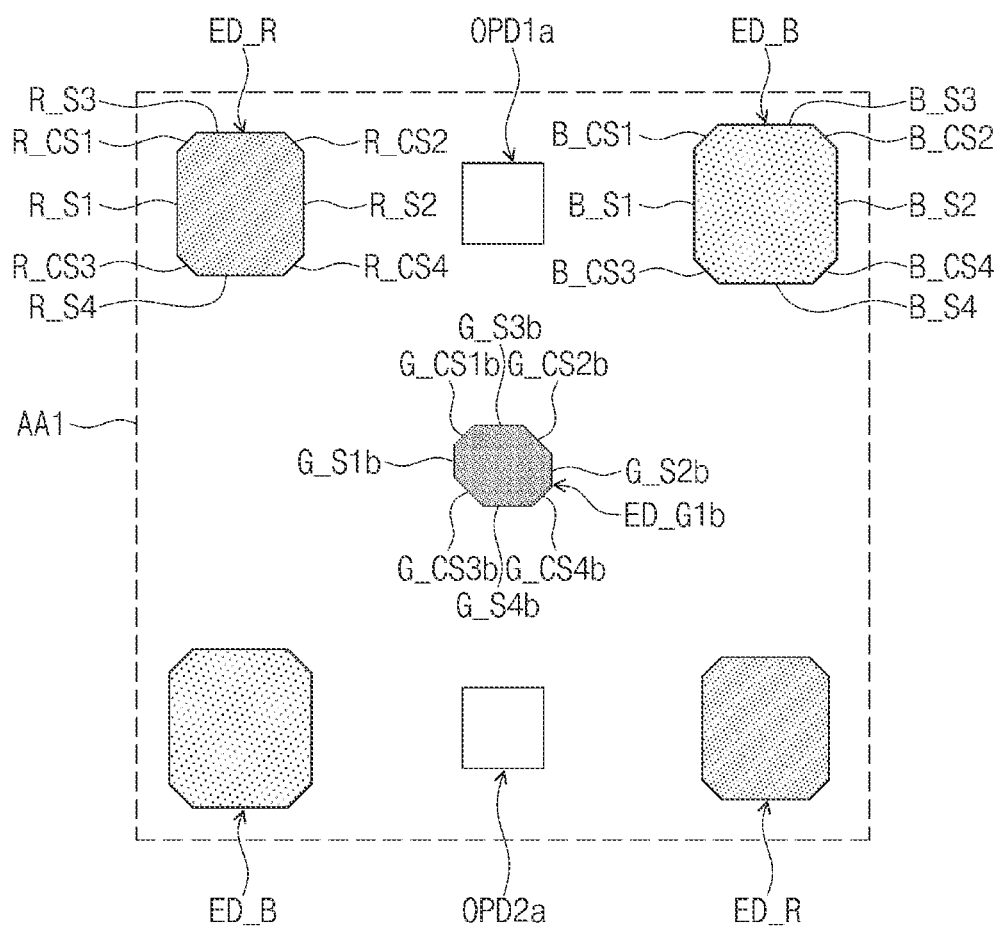
FIG. 8B is a schematic enlarged view of area AA1 of FIG. 8A.

FIG. 8A is a schematic enlarged plan view of a partial area of the display panel according to an embodiment. FIG. 8B is a schematic enlarged view of area AA1 of FIG. 8A.

Referring to FIGS. 8A and 8B, in the display panel DP according to an embodiment, red and blue light emitting elements ED_R and ED_B may have an octagonal shape that is long in the first direction DR1, and first and second green light emitting elements ED_G1b and ED_G2b may have an octagonal shape that is long in the second direction DR2. Each of the red and blue light emitting elements ED_R and ED_B may have a symmetrical shape with respect to a reference line that passes through the center point and is parallel to the first or second direction DR1 or DR2. For example, each of the first and second green light emitting elements ED_G1b and ED_G2b may have an asymmetrical shape with respect to a reference line that passes through the center point and is parallel to the first or second direction DR1 or DR2. The first and second green light emitting elements ED_G1b and ED_G2b may be symmetrical to each other with respect to a reference line parallel to the first direction DR1.

The red light emitting element ED_R may include first and second sides R_S1 and R_S2 parallel to the first direction DR1, third and fourth sides R_S3 and R_S4 parallel to the second direction DR2, and first to fourth inclined sides R_CS1, R_CS2, R_CS3, and R_CS4 inclined with respect to the first and second directions DR1 and DR2. The first and second sides R_S1 and R_S2 may be longer than the third and fourth sides R_S3 and R_S4. However, embodiments are not limited thereto. In another example, in case that the red light emitting element ED_R has an octagonal shape longer in the second direction DR2 than in the first direction DR1, the third and fourth sides R_S3 and R_S4 may be longer than the first and second sides R_S1 and R_S2.

In the red light emitting element ED_R, the first to fourth inclined sides R_CS1, R_CS2, R_CS3, and R_CS4 may have the same length. In an embodiment, the first to fourth inclined sides R_CS1, R_CS2, R_CS3, and R_CS4 may have a curved shape.

The blue light emitting element ED_B may include first and second sides B_S1 and B_S2 parallel to the first direction DR1, third and fourth sides B_S3 and B_S4 parallel to the second direction DR2, and first to fourth inclined sides B_CS1, B_CS2, B_CS3, and B_CS4 inclined with respect to the first and second directions DR1 and DR2. The first and second sides B_S1 and B_S2 may be longer than the third and fourth sides B_S3 and B_S4. However, embodiments are not limited thereto. In another example, in case that the blue light emitting element ED_B has an octagonal shape longer in the second direction DR2 than in the first direction DR1, the third and fourth sides B_S3 and B_S4 may be longer than the first and second sides B_S1 and B_S2.

In the blue light emitting element ED_B, the first to fourth inclined sides B_CS1, B_CS2, B_CS3, and B_CS4 may have the same length. In an embodiment, the first to fourth inclined sides B_CS1, B_CS2, B_CS3, and B_CS4 may have a curved shape.

Each of the first and second green light emitting elements ED_G1b and ED_G2b may include first and second sides G_S1b and G_S2b parallel to the first direction DR1, third and fourth sides G_S3b and G_S4b parallel to the second direction DR2, and first to fourth inclined sides G_CS1b, G_CS2b, G_CS3b, and G_CS4b inclined with respect to the first and second directions DR1 and DR2. In each of the first and second green light emitting elements ED_G1b and ED_G2b, the first and second sides G_S1b and G_S2b may have a different length from the third and fourth sides G_S3b and G_S4b. In each of the first and second green light emitting elements ED_G1b and ED_G2b, the first and fourth inclined sides G_CS1b and G_CS4b facing each other may have the same length, and the second and third inclined sides G_CS2b and G_CS3b facing each other may have the same length. The first and second inclined sides G_CS1b and G_CS2b may have different lengths, and the third and fourth inclined sides G_CS3b and G_CS4b may have different lengths. In an embodiment, in case that the blue light emitting element ED_B has a larger size than the red light emitting element ED_R, the second and third inclined sides G_CS2b and G_CS3b may be longer than the first and fourth inclined sides G_CS1b and G_CS4b.

The first and fourth inclined sides G_CS1b and G_CS4b of each of the first and second green light emitting elements ED_G1b and ED_G2b may be parallel to the first or fourth inclined side R_CS1 or R_CS4 of the red light emitting element ED_R adjacent thereto. The second and third inclined sides G_CS2b and G_CS3b of each of the first and second green light emitting elements ED_G1b and ED_G2b may be parallel to the second or third inclined side R_CS2 or R_CS3 of the blue light emitting element ED_B adjacent thereto. In another example, the first to fourth inclined sides G_CS1b, G_CS2b, G_CS3b, and G_CS4b may have a curved shape.

Each of the sensors FX (refer to FIG. 5A) may include a light sensing unit LSUa. The light sensing unit LSUa may include at least one light sensing element. FIG. 8A illustrates one example that the light sensing unit LSUa may include two light sensing elements (hereinafter, referred to as first and second light sensing elements OPD1a and OPD2a). However, embodiments are not limited thereto. For example, the light sensing unit LSUa may include one light sensing element, or may include four light sensing elements.

In an embodiment, the first and second light sensing elements OPD1a and OPD2a may be disposed to correspond to one reference pixel unit RPU. However, the number of light sensing elements disposed to correspond to each reference pixel unit RPU is not limited thereto. For example, one light sensing element may be disposed to correspond to each reference pixel unit RPU.

The first and second light sensing elements OPD1a and OPD2a may have a different shape from the red and blue light emitting elements ED_R and ED_B. In an embodiment, the first and second light sensing elements OPD1a and OPD2a may have a square shape.

Each of the first and second light sensing elements OPD1a and OPD2a may include first and second vertical sides VS1 and VS2 parallel to the first direction DR1 and first and second horizontal sides HS1 and HS2 parallel to the second direction DR2. In an embodiment, the first and second vertical sides VS1 and VS2 may have the same length as the first and second horizontal sides HS1 and HS2. The first and second vertical sides VS1 and VS2 and the first and second horizontal sides HS1 and HS2 may have a length smaller than or equal to the length of at least one of the first to fourth sides R_S1 to R_S4 and B_S1 to B_S4 of the red and blue light emitting elements ED_R and ED_B.

In another example, the first and second light sensing elements OPD1a and OPD2a may have a rectangular shape that is long in the first direction DR1 or the second direction DR2.

Figure 9:
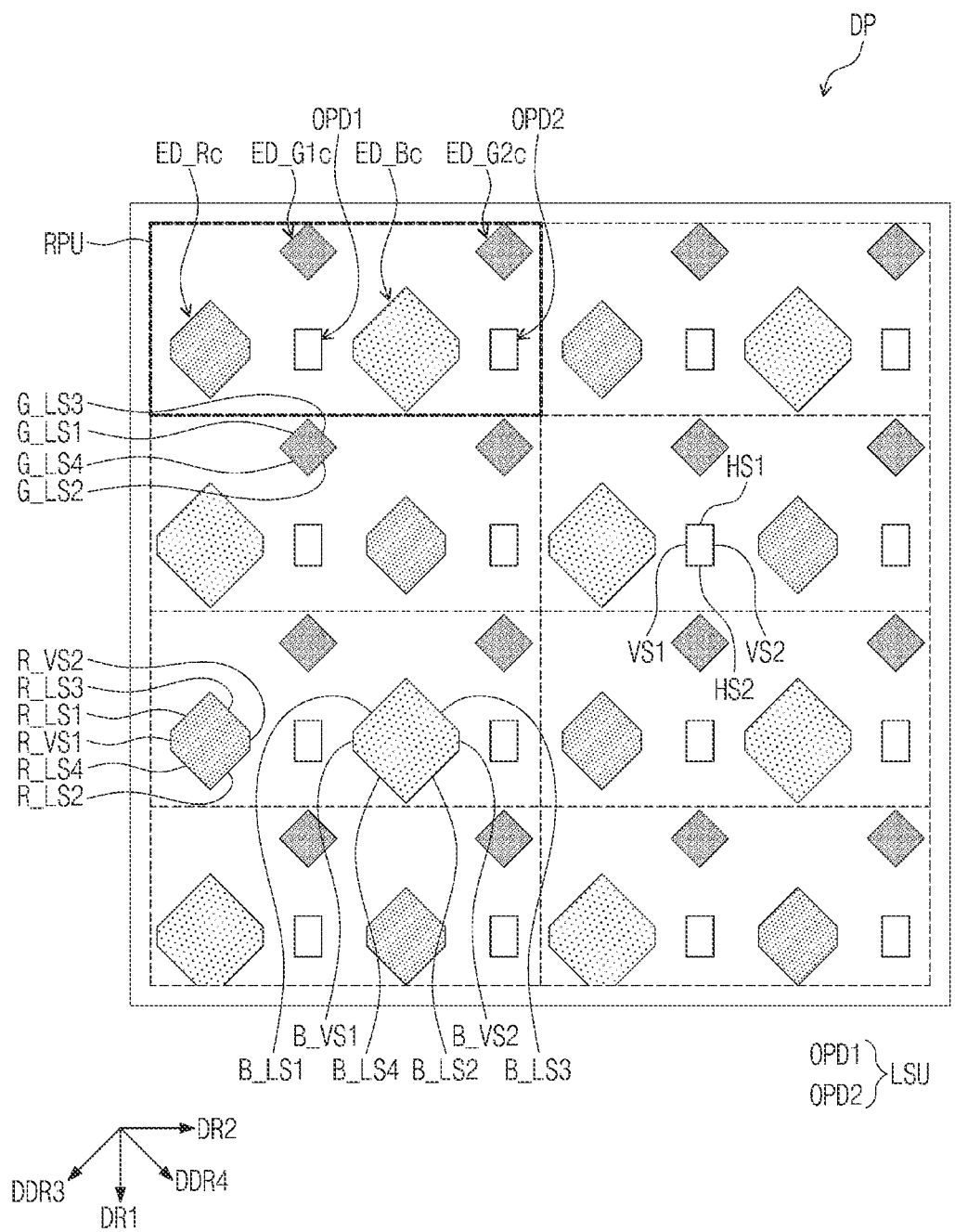
FIG. 9 is a schematic enlarged plan view of a partial area of the display panel according to an embodiment.

FIG. 9 is a schematic enlarged plan view of a partial area of the display panel according to an embodiment.

Referring to FIG. 9, in the display panel DP according to an embodiment, red and blue light emitting elements ED_Rc and ED_Bc may have a hexagonal shape, and first and second green light emitting elements ED_G1c and ED_G2c may have a rhombic shape.

The red light emitting element ED_Rc may include first and second sides R_VS1 and R_VS2 parallel to the first direction DR1, first and second inclined sides R_LS1 and R_LS2 parallel to a third diagonal direction DDR3, and third and fourth inclined sides R_LS3 and R_LS4 parallel to a fourth diagonal direction DDR4. The third and fourth diagonal directions DDR3 and DDR4 may be directions inclined with respect to the first and second directions DR1 and DR2. The first to fourth inclined sides R_LS1, R_LS2, R_LS3, and R_LS4 may be longer than the first and second sides R_VS1 and R_VS2.

The blue light emitting element ED_Bc may include first and second sides B_VS1 and B_VS2 parallel to the first direction DR1, first and second inclined sides B_LS1 and B_LS2 parallel to the third diagonal direction DDR3, and third and fourth inclined sides B_LS3 and B_LS4 parallel to the fourth diagonal direction DDR4. The first to fourth inclined sides B_LS1, B_LS2, B_LS3, and B_LS4 may be longer than the first and second sides B_VS1 and B_VS2.

Each of the first and second green light emitting elements ED_G1c and ED_G2c may include first and second sides G_LS1 and G_LS2 parallel to the third diagonal direction DDR3 and third and fourth sides G_LS3 and G_LS4 parallel to the fourth diagonal direction DDR4. In each of the first and second green light emitting elements ED_G1c and ED_G2c, the first and second sides G_LS1 and G_LS2 may have the same length as the third and fourth sides G_LS3 and G_LS4.

Each of the sensors FX (refer to FIG. 5A) may include a light sensing unit LSU. The light sensing unit LSU may include at least one light sensing element. FIG. 9 illustrates one example that the light sensing unit LSU includes two light sensing elements (hereinafter, referred to as first and second light sensing elements OPD1 and OPD2). However, embodiments are not limited thereto. For example, the light sensing unit LSU may include one light sensing element, or may include four light sensing elements.

In an embodiment, the first and second light sensing elements OPD1 and OPD2 may be disposed to correspond to one reference pixel unit RPU. However, the number of light sensing elements disposed to correspond to each reference pixel unit RPU is not limited thereto. For example, one light sensing element may be disposed to correspond to each reference pixel unit RPU.

The first and second light sensing elements OPD1 and OPD2 may have a different shape from the red and blue light emitting elements ED_Rc and ED_Bc. In an embodiment, the first and second light sensing elements OPD1 and OPD2 may have a rectangular shape.

Each of the first and second light sensing elements OPD1 and OPD2 may include first and second vertical sides VS1 and VS2 parallel to the first direction DR1 and first and second horizontal sides HS1 and HS2 parallel to the second direction DR2. In an embodiment, the first and second vertical sides VS1 and VS2 may be longer than the first and second horizontal sides HS1 and HS2. In another example, the first and second light sensing elements OPD1 and OPD2 may have a square shape. For example, the first and second vertical sides VS1 and VS2 may have the same length as the first and second horizontal sides HS1 and HS2.

In case that two or more light sensing elements OPD1 and OPD2 are disposed in one reference pixel unit RPU as described above, the light sensing elements OPD1 and OPD2 may have a different shape from light emitting elements (e.g., the red and blue light emitting elements ED_Rc and ED_Bc), and thus the light sensing elements OPD1 and OPD2 may be formed to be large in size. Accordingly, deterioration in the performance of the sensor FX may be prevented. Furthermore, by making the shapes of the light sensing elements OPD1 and OPD2 different from the shapes of the light emitting elements (e.g., the red and blue light emitting elements ED_Rc and ED_Bc), the gaps between the light sensing elements OPD1 and OPD2 and the light emitting elements ED_Rc, ED_G1c, ED_G2c, and ED_Bc adjacent thereto may be secured according to process constraint conditions (e.g., a minimum mask opening size). Accordingly, the process reliability of the display panel DP may be improved without deterioration in the performance of the sensor FX and the resolution of the display panel DP.

Figure 10:
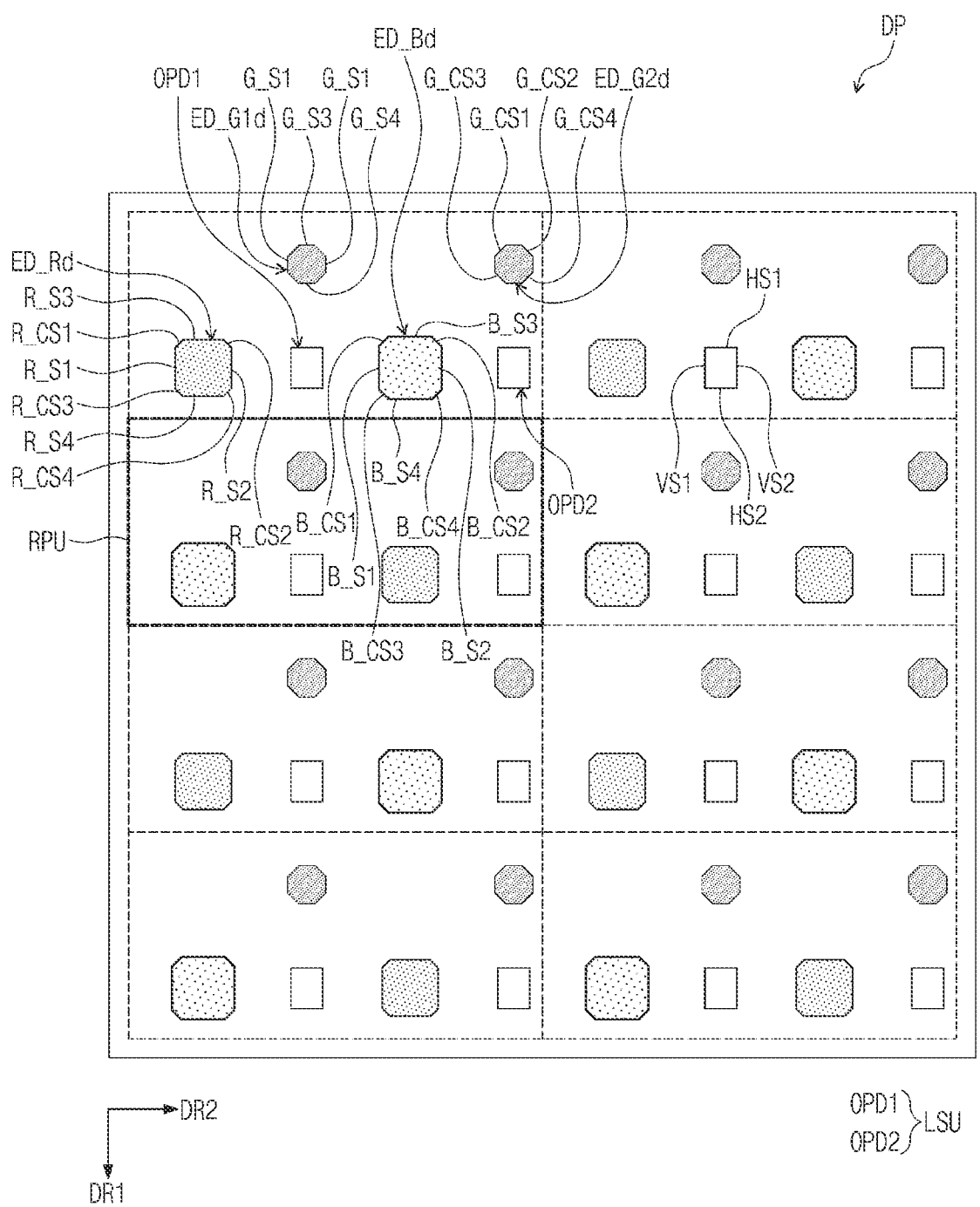
FIG. 10 is a schematic enlarged plan view of a partial area of the display panel according to an embodiment.

FIG. 10 is a schematic enlarged plan view of a partial area of the display panel according to an embodiment.

Referring to FIG. 10, in the display panel DP according to an embodiment, red and blue light emitting elements ED_Rd and ED_Bd may have an octagonal shape having the same length in the first direction DR1 and the second direction DR2. First and second green light emitting elements ED_G1d and ED_G2d may have a smaller size than the red and blue light emitting elements ED_Rd and ED_Bd, but may have the same shape as the red and blue light emitting elements ED_Rd and ED_Bd. For example, the first and second green light emitting elements ED_G1d and ED_G2d may have an octagonal shape having the same length in the first direction DR1 and the second direction DR2.

The red light emitting element ED_Rd may include first and second sides R_S1 and R_S2 parallel to the first direction DR1, third and fourth sides R_S3 and R_S4 parallel to the second direction DR2, and first to fourth inclined sides R_CS1, R_CS2, R_CS3, and R_CS4 inclined with respect to the first and second directions DR1 and DR2. The first and second sides R_S1 and R_S2 may have the same length as the third and fourth sides R_S3 and R_S4. In the red light emitting element ED_Rd, the first to fourth inclined sides R_CS1, R_CS2, R_CS3, and R_CS4 may have the same length. In an embodiment, the first to fourth inclined sides R_CS1, R_CS2, R_CS3, and R_CS4 may have a curved shape.

The blue light emitting element ED_Bd may include first and second sides B_S1 and B_S2 parallel to the first direction DR1, third and fourth sides B_S3 and B_S4 parallel to the second direction DR2, and first to fourth inclined sides B_CS1, B_CS2, B_CS3, and B_CS4 inclined with respect to the first and second directions DR1 and DR2. The first and second sides B_S1 and B_S2 may have the same length as the third and fourth sides B_S3 and B_S4. In the blue light emitting element ED_Bd, the first to fourth inclined sides B_CS1, B_CS2, B_CS3, and B_CS4 may have the same length. In an embodiment, the first to fourth inclined sides B_CS1, B_CS2, B_CS3, and B_CS4 may have a curved shape.

Each of the first and second green light emitting elements ED_G1d and ED_G2d may include first and second sides G_S1 and G_S2 parallel to the first direction DR1, third and fourth sides G_S3 and G_S4 parallel to the second direction DR2, and first to fourth inclined sides G_CS1, G_CS2, G_CS3, and G_CS4 inclined with respect to the first and second directions DR1 and DR2. In each of the first and second green light emitting elements ED_G1d and ED_G2d, the first and second sides G_S1 and G_S2 may have the same length as the third and fourth sides G_S3 and G_S4. In each of the first and second green light emitting elements ED_G1d and ED_G2d, the first to fourth inclined sides G_CS1, G_CS2, G_CS3, and G_CS4 may have the same length. In an embodiment, the first to fourth inclined sides G_CS1, G_CS2, G_CS3, and G_CS4 may have a curved shape.

Each of the sensors FX (refer to FIG. 5A) may include a light sensing unit LSU. The light sensing unit LSU may include at least one light sensing element. FIG. 10 illustrates one example that the light sensing unit LSU includes two light sensing elements (hereinafter, referred to as first and second light sensing elements OPD1 and OPD2). However, embodiments are not limited thereto. For example, the light sensing unit LSU may include one light sensing element, or may include four light sensing elements.

In an embodiment, the first and second light sensing elements OPD1 and OPD2 may be disposed to correspond to one reference pixel unit RPU. However, the number of light sensing elements disposed to correspond to each reference pixel unit RPU is not limited thereto. For example, one light sensing element may be disposed to correspond to each reference pixel unit RPU.

The first and second light sensing elements OPD1 and OPD2 may have a different shape from the red and blue light emitting elements ED_Rd and ED_Bd. In an embodiment, the first and second light sensing elements OPD1 and OPD2 may have a rectangular shape.

Each of the first and second light sensing elements OPD1 and OPD2 may include first and second vertical sides VS1 and VS2 parallel to the first direction DR1 and first and second horizontal sides HS1 and HS2 parallel to the second direction DR2. In an embodiment, the first and second vertical sides VS1 and VS2 may be longer than the first and second horizontal sides HS1 and HS2. The first and second vertical sides VS1 and VS2 may have a length smaller than or equal to the lengths of the first and second sides R_S1 and R_S2 of the red light emitting element ED_Rd.

In another example, the first and second light sensing elements OPD1 and OPD2 may have a square shape having the same length in the first direction DR1 and the second direction DR2, or may have a rhombic shape.

Figure 11:
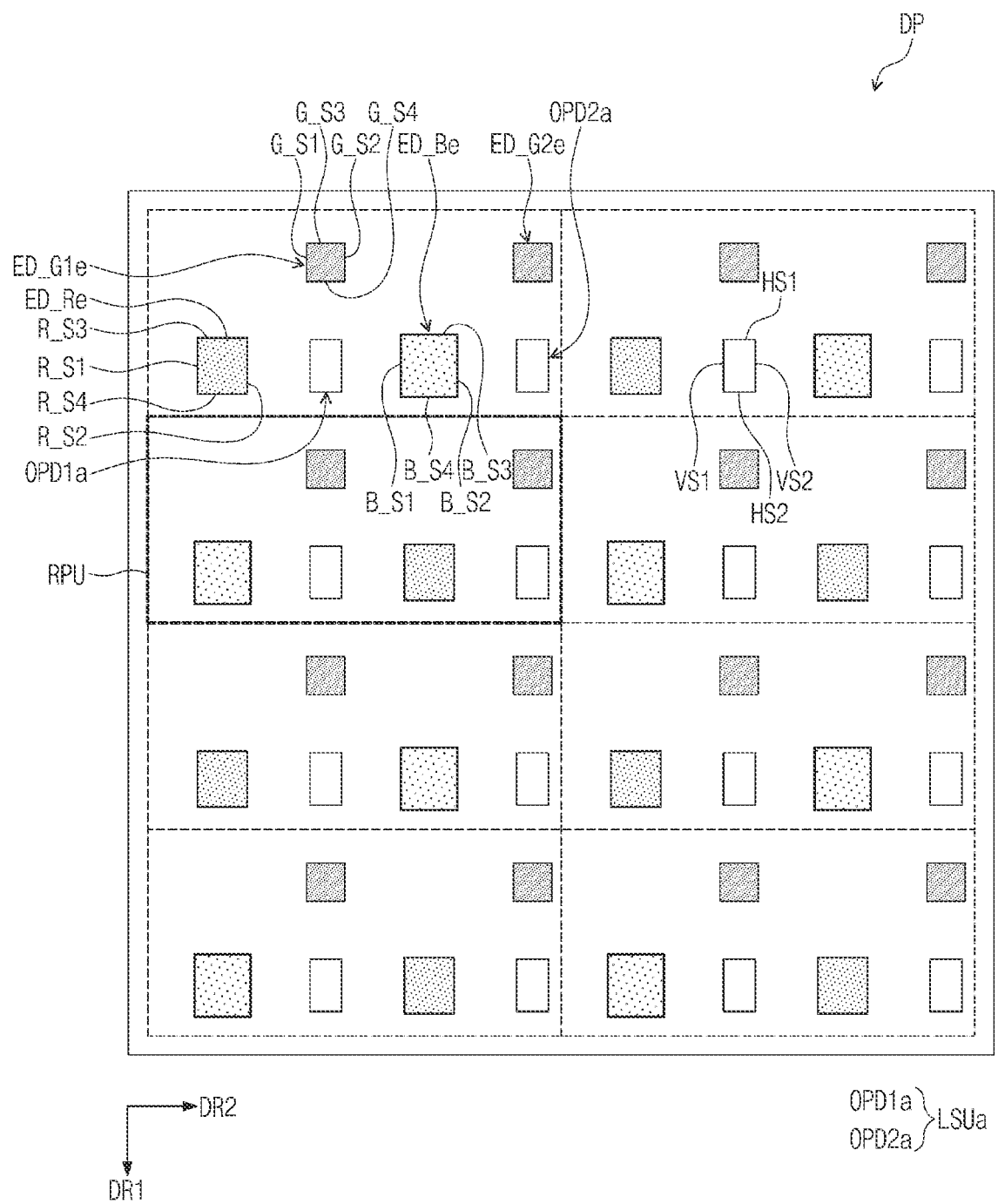
FIG. 11 is a schematic enlarged plan view of a partial area of the display panel according to an embodiment.

FIG. 11 is a schematic enlarged plan view of a partial area of the display panel according to an embodiment.

In the display panel DP according to an embodiment, red and blue light emitting elements ED_Re and ED_Be may have a square shape having the same length in the first direction DR1 and the second direction DR2. First and second green light emitting elements ED_G1e and ED_G2e may have a smaller size than the red and blue light emitting elements ED_Re and ED_Be, but may have the same shape as the red and blue light emitting elements ED_Re and ED_Be. For example, the first and second green light emitting elements ED_G1e and ED_G2e may have a square shape having the same length in the first direction DR1 and the second direction DR2.

The red light emitting element ED_Re may include first and second sides R_S1 and R_S2 parallel to the first direction DR1 and third and fourth sides R_S3 and R_S4 parallel to the second direction DR2. The first and second sides R_S1 and R_S2 may have the same length as the third and fourth sides R_S3 and R_S4.

The blue light emitting element ED_Be may include first and second sides B_S1 and B_S2 parallel to the first direction DR1 and third and fourth sides B_S3 and B_S4 parallel to the second direction DR2. The first and second sides B_S1 and B_S2 may have the same length as the third and fourth sides B_S3 and B_S4.

Each of the first and second green light emitting elements ED_G1e and ED_G2e may include first and second sides G_S1 and G_S2 parallel to the first direction DR1 and third and fourth sides G_S3 and G_S4 parallel to the second direction DR2. In each of the first and second green light emitting elements ED_G1e and ED_G2e, the first and second sides G_S1 and G_S2 may have the same length as the third and fourth sides G_S3 and G_S4.

Each of the sensors FX (refer to FIG. 5A) may include a light sensing unit LSUa. The light sensing unit LSUa may include at least one light sensing element. FIG. 11 illustrates one example that the light sensing unit LSUa includes two light sensing elements (hereinafter, referred to as first and second light sensing elements OPD1a and OPD2a). However, embodiments are not limited thereto. For example, the light sensing unit LSUa may include one light sensing element, or may include four light sensing elements.

In an embodiment, the first and second light sensing elements OPD1a and OPD2a may be disposed to correspond to one reference pixel unit RPU. However, the number of light sensing elements disposed to correspond to each reference pixel unit RPU is not limited thereto. For example, one light sensing element may be disposed to correspond to each reference pixel unit RPU.

The first and second light sensing elements OPD1a and OPD2a may have a different shape from the red and blue light emitting elements ED_Re and ED_Be. In an embodiment, the first and second light sensing elements OPD1a and OPD2a may have a rectangular shape.

Each of the first and second light sensing elements OPD1a and OPD2a may include first and second vertical sides VS1 and VS2 parallel to the first direction DR1 and first and second horizontal sides HS1 and HS2 parallel to the second direction DR2. In an embodiment, the first and second vertical sides VS1 and VS2 may be longer than the first and second horizontal sides HS1 and HS2. The first and second vertical sides VS1 and VS2 may have a length smaller than or equal to the lengths of the first and second sides R_S1 and R_S2 of the red light emitting element ED_Re.

In another example, the first and second light sensing elements OPD1a and OPD2a may have a rhombic shape.

In case that two or more light sensing elements OPD1a and OPD2a are disposed in one reference pixel unit RPU as described above, the light sensing elements OPD1a and OPD2a may have a different shape from light emitting elements (e.g., the red and blue light emitting elements ED_Re and ED_Be), and thus the light sensing elements OPD1a and OPD2a may be formed to be large in size. Accordingly, deterioration in the performance of the sensor FX may be prevented. Furthermore, by making the shapes of the light sensing elements OPD1a and OPD2a different from the shapes of the light emitting elements (e.g., the red and blue light emitting elements ED_Re and ED_Be), the gaps between the light sensing elements OPD1a and OPD2a and the light emitting elements ED_Re, ED_G1e, ED_G2e, and ED_Be adjacent thereto may be secured according to process constraint conditions (e.g., a minimum mask opening size). Accordingly, the process reliability of the display panel DP may be improved without deterioration in the performance of the sensor FX and the resolution of the display panel DP.

Figure 12:
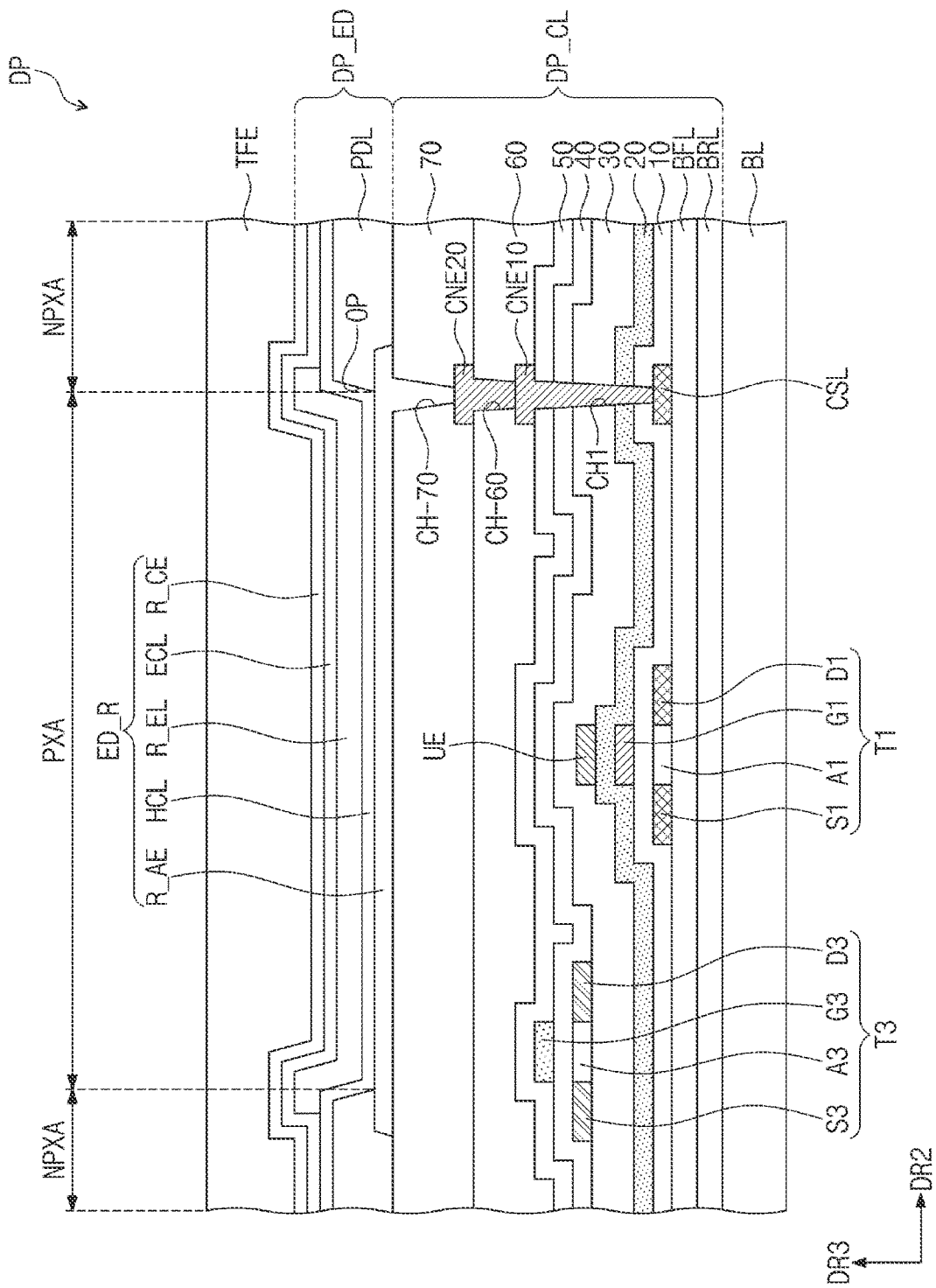
FIG. 12 is a schematic sectional view illustrating a pixel of the display panel according to an embodiment.
Figure 13A:
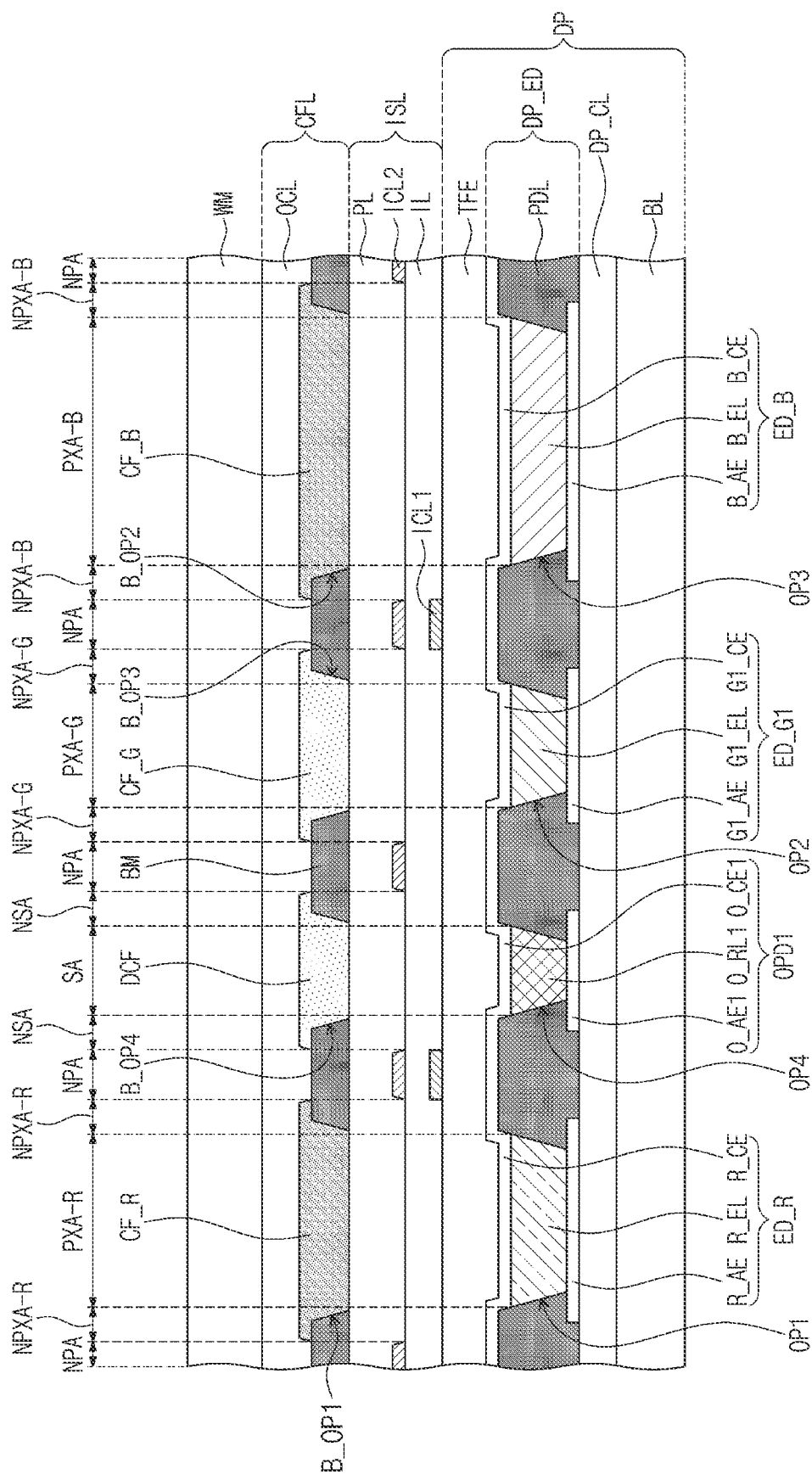
FIGS. 13A and 13B are schematic sectional views illustrating a light emitting element and a light sensing element of the display panel according to an embodiment.
Figure 13B:
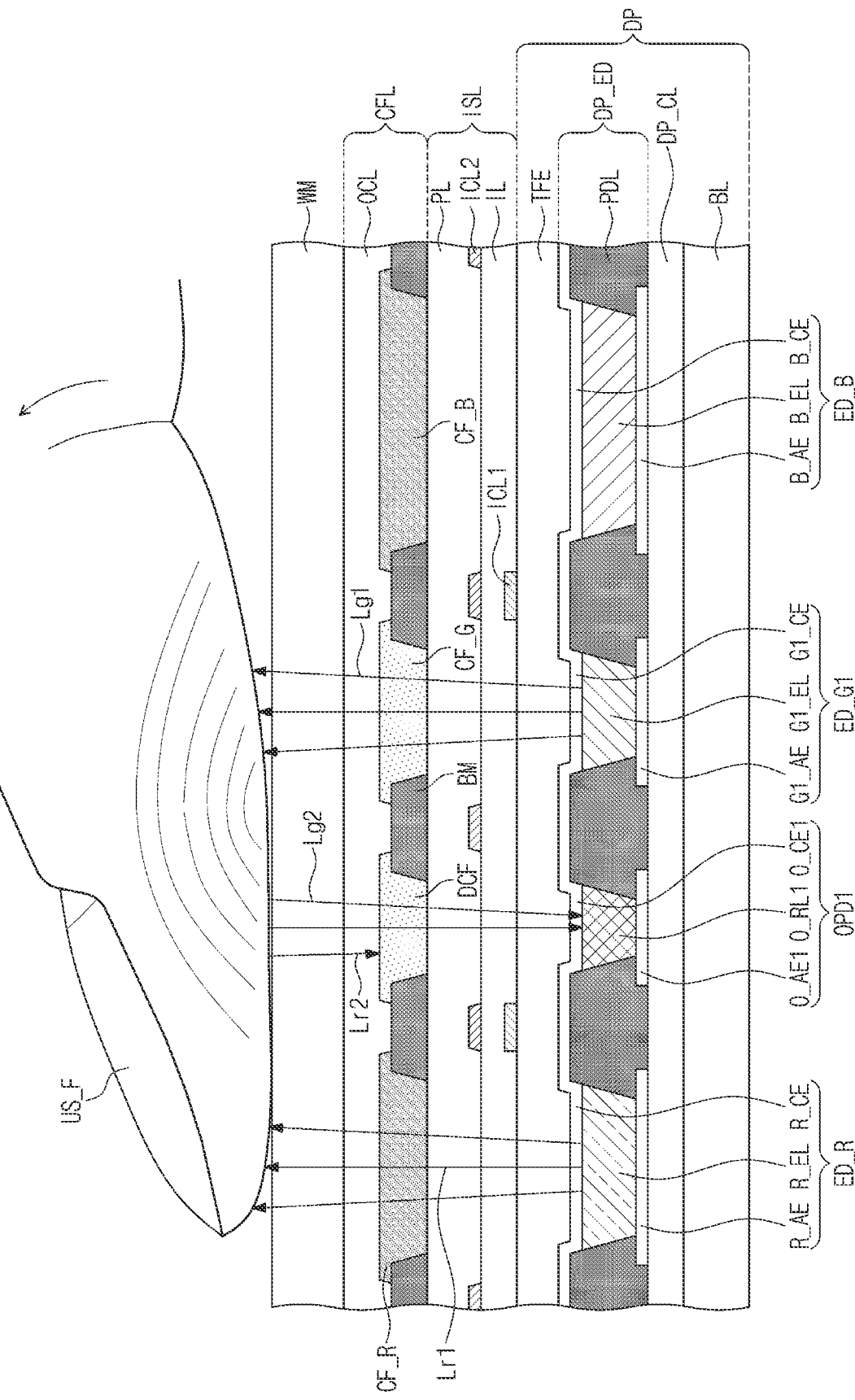

FIG. 12 is a schematic sectional view illustrating a pixel of the display panel according to an embodiment. FIGS. 13A and 13B are schematic sectional views illustrating a light emitting element and a light sensing element of the display panel according to an embodiment.

Referring to FIGS. 12 and 13A, the display panel DP may include the base layer BL, and the circuit layer DP_CL, the element layer DP_ED, and the encapsulation layer TFE disposed on the base layer BL.

The base layer BL may include a synthetic resin layer. The synthetic resin layer may include a thermosetting resin. For example, the synthetic resin layer may be a polyimide-based resin layer, and the material thereof is not limited. The synthetic resin layer may include at least one of an acrylate-based resin, a methacrylate-based resin, a polyisoprene-based resin, a vinyl-based resin, an epoxy-based resin, a urethane-based resin, a celluose-based resin, a siloxane-based resin, a polyamide-based resin, and a perylene-based resin. For example, the base layer BL may include a glass substrate, a metal substrate, or an organic/inorganic composite substrate.

At least one inorganic layer may be formed on the upper surface of the base layer BL. The inorganic layer may include at least one of aluminum oxide, titanium oxide, silicon oxide, silicon oxy-nitride, zirconium oxide, and hafnium oxide. The inorganic layer may be formed in multiple layers. The multiple inorganic layers may constitute a barrier layer BRL and/or a buffer layer BFL that will be described below. The barrier layer BRL and the buffer layer BFL may be selectively disposed.

The barrier layer BRL may prevent infiltration (or permeation) of foreign matter from the outside. The barrier layer BRL may include a silicon oxide layer and a silicon nitride layer. Silicon oxide layers and silicon nitride layers may be provided. The silicon oxide layers and the silicon nitride layers may be alternately stacked one above another.

The buffer layer BFL may be disposed on the barrier layer BRL. The buffer layer BFL may improve the coupling force between the base layer BL and a semiconductor pattern and/or a conductive pattern. The buffer layer BFL may include silicon oxide layers and silicon nitride layers. The silicon oxide layers and the silicon nitride layers may be alternately stacked one above another.

A semiconductor pattern may be disposed on the buffer layer BFL. Hereinafter, the semiconductor pattern disposed (e.g., directly disposed) on the buffer layer BFL may be defined as a first semiconductor pattern. The first semiconductor pattern may include a silicon semiconductor. The first semiconductor pattern may include poly-silicon. However, embodiments are not limited thereto, the first semiconductor pattern may include amorphous silicon.

FIG. 12 illustrates a portion of the first semiconductor pattern, and the first semiconductor pattern may be additionally disposed in another area of the red pixel PXR (refer to FIG. 6A). The first semiconductor pattern may have different electrical properties according to whether the first semiconductor pattern is doped or not. The first semiconductor pattern may include a doped area and an undoped area. The doped area may be doped with an N-type dopant or a P-type dopant. A P-type transistor may include a doped area doped with a P-type dopant, and an N-type transistor may include a doped area doped with an N-type dopant.

The doped area may have a higher conductivity than the undoped area and may substantially function as an electrode or a signal line. The undoped area substantially corresponds to an active area (or, a channel) of a transistor. In other words, a portion of the first semiconductor pattern may be an active area of a transistor, another portion may be a source or drain of the transistor, and another portion may be a connecting signal line (or, a connecting electrode).

As illustrated in FIG. 12, the first electrode S1, a channel part A1, and the second electrode D1 of the first transistor T1 may be formed from the first semiconductor pattern. The first electrode S1 and the second electrode D1 of the first transistor T1 may extend from the channel part A1 in opposite directions.

In FIG. 12, a portion of a connecting signal line CSL formed from the semiconductor pattern is illustrated. Although not separately illustrated, the connecting signal line CSL may be connected to the second electrode of the second light emission control transistor ET2 (refer to FIG. 6A) on the plane.

A first insulating layer 10 may be disposed on the buffer layer BFL. The first insulating layer 10 may commonly overlap the pixels PX (refer to FIG. 3) and may cover the first semiconductor pattern. The first insulating layer 10 may be an inorganic layer and/or an organic layer and may have a single-layer structure or a multi-layer structure. The first insulating layer 10 may include at least one of aluminum oxide, titanium oxide, silicon oxide, silicon oxy-nitride, zirconium oxide, and hafnium oxide. In an embodiment, the first insulating layer 10 may be a single silicon oxide layer. Not only the first insulating layer 10 but also insulating layers of the circuit layer DP_CL to be described below may be inorganic layers and/or organic layers and may have a single-layer structure or a multi-layer structure. The inorganic layers may include at least one of the aforementioned materials.

The third electrode G1 of the first transistor T1 may be disposed on the first insulating layer 10. The third electrode G1 may be a portion of a metal pattern. The third electrode G1 of the first transistor T1 may overlap the channel part A1 of the first transistor T1. The third electrode G1 of the first transistor T1 may function as a mask in a process of doping the first semiconductor pattern.

A second insulating layer 20 that covers the third electrode G1 may be disposed on the first insulating layer 10. The second insulating layer 20 may commonly overlap the pixels PX. The second insulating layer 20 may be an inorganic layer and/or an organic layer and may have a single-layer structure or a multi-layer structure. In an embodiment, the second insulating layer 20 may be a single silicon oxide layer.

An upper electrode UE may be disposed on the second insulating layer 20. The upper electrode UE may overlap the third electrode G1. The upper electrode UE may be a portion of a metal pattern, or may be a portion of a doped semiconductor pattern. A portion of the third electrode G1 and the upper electrode UE overlapping the portion of the third electrode G1 may define the capacitor Cst (refer to FIG. 6A). In an embodiment, the upper electrode UE may be omitted.

In an embodiment, the second insulating layer 20 may be replaced with an insulating pattern. The upper electrode UE may be disposed on the insulating pattern. The upper electrode UE may function as a mask that forms the insulating pattern from the second insulating layer 20.

A third insulating layer 30 that covers the upper electrode UE may be disposed on the second insulating layer 20. In an embodiment, the third insulating layer 30 may be a single silicon oxide layer. A semiconductor pattern may be disposed on the third insulating layer 30. Hereinafter, the semiconductor pattern disposed (e.g., directly disposed) on the third insulating layer 30 may be defined as a second semiconductor pattern. The second semiconductor pattern may include metal oxide. An oxide semiconductor may include a crystalline or amorphous oxide semiconductor. For example, the oxide semiconductor may include metal oxide of zinc (Zn), indium (In), gallium (Ga), tin (Sn), or titanium (Ti), or may include metal such as zinc (Zn), indium (In), gallium (Ga), tin (Sn), or titanium (Ti) and a mixture of oxide thereof. The oxide semiconductor may include indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), or zinc-tin oxide (ZTO).

FIG. 12 illustrates a portion of the second semiconductor pattern, and the second semiconductor pattern may be additionally disposed in another area of the red pixel PXR (refer to FIG. 6A). The second semiconductor pattern may include areas distinguished according to whether metal oxide is reduced or not. An area where metal oxide is reduced (hereinafter, referred to as the reduced area) may have a higher conductivity than an area where metal oxide is not reduced (hereinafter, referred to as the non-reduced area). The reduced area may substantially function as an electrode or a signal line. The non-reduced area substantially corresponds to a channel part of a transistor. In other words, one portion of the second semiconductor pattern may be a channel part of a transistor, and another portion may be a first electrode or a second electrode of the transistor.

As illustrated in FIG. 12, the first electrode S3, a channel part A3, and the second electrode D3 of the third transistor T3 may be formed from the second semiconductor pattern. The first electrode S3 and the second electrode D3 include metal reduced from a metal oxide semiconductor. The first electrode S3 and the second electrode D3 may include a metal layer having a certain thickness from the upper surface of the second semiconductor pattern and including the reduced metal.

A fourth insulating layer 40 that covers the second semiconductor pattern may be disposed on the third insulating layer 30. In an embodiment, the fourth insulating layer 40 may be a single silicon oxide layer. The third electrode G3 of the third transistor T3 may be disposed on the third insulating layer 30. The third electrode G3 may be a portion of a metal pattern. The third electrode G3 of the third transistor T3 may overlap the channel part A3 of the third transistor T3.

In an embodiment, the fourth insulating layer 40 may be replaced with an insulating pattern. The third electrode G3 of the third transistor T3 may be disposed on the insulating pattern. In an embodiment, the third electrode G3 may have the same shape as the insulating pattern on the plane. Although one third electrode G3 is illustrated in an embodiment for convenience of description, the third transistor T3 may include two third electrodes.

A fifth insulating layer 50 that covers the third electrode G3 may be disposed on the fourth insulating layer 40. In an embodiment, the fifth insulating layer 50 may include a silicon oxide layer and a silicon nitride layer. The fifth insulating layer 50 may include silicon oxide layers and silicon nitride layers alternately stacked one above another.

For example, the first electrode and the second electrode of the fourth transistor T4 (refer to FIG. 6A) and the first electrode S3 and the second electrode D3 of the third transistor T3 may be formed by the same process. Furthermore, the first and second electrodes of the reset transistor ST1 (refer to FIG. 6A) of the sensor FX (refer to FIG. 6A), the first and second electrodes of the output transistor ST3 (refer to FIG. 6A) of the sensor FX, and the first electrode S3 and the second electrode D3 of the third transistor T3 may be simultaneously formed by the same process as.

At least one insulating layer may be additionally disposed on the fifth insulating layer 50. As in an embodiment, a sixth insulating layer 60 and a seventh insulating layer 70 may be disposed on the fifth insulating layer 50. The sixth insulating layer 60 and the seventh insulating layer 70 may be organic layers and may have a single-layer structure or a multi-layer structure. Each of the sixth insulating layer 60 and the seventh insulating layer 70 may be a single polyimide-based resin layer. Embodiments are not limited thereto, the sixth insulating layer 60 and the seventh insulating layer 70 may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin.

A first connecting electrode CNE10 may be disposed on the fifth insulating layer 50. The first connecting electrode CNE10 may be connected to the connecting signal line CSL through a first contact hole CH1 penetrating the first to fifth insulating layers 10 to 50, and a second connecting electrode CNE20 may be connected to the first connecting electrode CNE10 through a contact hole CH-60 penetrating the sixth insulating layer 60. In an embodiment, at least one of the fifth, sixth, and seventh insulating layers 50, 60, and 70 may be omitted.

The element layer DP_ED may include the red light emitting element ED_R and a pixel defining film PDL. The red anode electrode R_AE of the red light emitting element ED_R may be disposed on the seventh insulating layer 70. The red anode electrode R_AE of the red light emitting element ED_R may be connected to the second connecting electrode CNE20 through a contact hole CH-70 penetrating the seventh insulating layer 70.

An opening OP of the pixel defining film PDL may expose at least a portion of the red anode electrode R_AE of the red light emitting element ED_R. The opening OP of the pixel defining film PDL may define an emissive area PXA. For example, the pixels PX (refer to FIG. 3) may be disposed on the plane of the display panel DP (refer to FIG. 3) according to a certain rule. The area where the pixels PX may be disposed may be defined as a pixel area, and one pixel area may include an emissive area PXA and a non-emissive area NPXA adjacent to the emissive area PXA. The non-emissive area NPXA may surround the emissive area PXA.

A hole control layer HCL may be commonly disposed in the emissive area PXA and the non-emissive area NPXA. A common layer, such as the hole control layer HCL, may be commonly formed for the pixels PX. The hole control layer HCL may include a hole transporting layer and a hole injection layer.

The red light emitting layer R_EL may be disposed on the hole control layer HCL. The red light emitting layer R_EL may be disposed only in the area corresponding to the opening OP. The red light emitting layer R_EL may be separately formed in each of the pixels PX.

Although the patterned red light emitting layer R_EL is illustrated in an embodiment, embodiments are not limited thereto. A common light emitting layer may be commonly disposed for the pixels PX. For example, the common light emitting layer may generate white light or blue light.

An electron control layer ECL may be disposed on the red light emitting layer R_EL. The electron control layer ECL may include an electron transporting layer and an electron injection layer. The cathode electrode R_CE of the red light emitting element ED_R may be disposed on the electron control layer ECL. The electron control layer ECL and the cathode electrode R_CE may be commonly disposed for the pixels PX.

The encapsulation layer TFE may be disposed on the cathode electrode R_CE. The encapsulation layer TFE may cover the pixels PX. In an embodiment, the encapsulation layer TFE may cover (e.g., directly cover) the cathode electrode R_CE. In an embodiment, the display panel DP may further include a capping layer that covers (e.g., directly covers) the cathode electrode R_CE. In an embodiment, the stacked structure of the red light emitting element ED_R may have a structure in which the structure illustrated in FIG. 12 is inverted.

Referring to FIGS. 13A and 13B, a first electrode layer may be disposed on the circuit layer DP_CL. The pixel defining film PDL may be formed on the first electrode layer. The first electrode layer may include the red, green, and blue anode electrodes R_AE, G1_AE, and B_AE. First to third openings OP1, OP2, and OP3 of the pixel defining film PDL may expose at least portions of the red, green, and blue anode electrodes R_AE, G1_AE, and B_AE, respectively. In an embodiment, the pixel defining film PDL may additionally include a black material. The pixel defining film PDL may additionally include a black organic dye/pigment, such as carbon black, aniline black, or the like. The pixel defining film PDL may be formed by mixing a blue organic material and a black organic material. The pixel defining film PDL may additionally include a liquid-repellent organic material.

As illustrated in FIG. 13A, the display panel DP may include first to third emissive areas PXA-R, PXA-G, and PXA-B and first to third non-emissive areas NPXA-R, NPXA-G, and NPXA-B adjacent to the first to third emissive areas PXA-R, PXA-G, and PXA-B. The non-emissive areas NPXA-R, NPXA-G, and NPXA-B may surround the corresponding emissive areas PXA-R, PXA-G, and PXA-B, respectively. In an embodiment, the first emissive area PXA-R may be defined to correspond to a partial area of the red anode electrode R_AE exposed by the first opening OP1. The second emissive area PXA-G is defined to correspond to a partial area of the green anode electrode G1_AE exposed by the second opening OP2. The third emissive area PXA-B is defined to correspond to a partial area of the blue anode electrode B_AE exposed by the third opening OP3. A non-pixel area NPA may be defined between the first to third non-emissive areas NPXA-R, NPXA-G, and NPXA-B.

A light emitting layer may be disposed on the first electrode layer. The light emitting layer may include the red, green, and blue light emitting layers R_EL, G1_EL, and B_EL. The red, green, and blue light emitting layers R_EL, G1_EL, and B_EL may be disposed in areas corresponding to the first to third openings OP1, OP2, and OP3, respectively. The red, green, and blue light emitting layers R_EL, G1_EL, and B_EL may be separately formed in the red, green, and blue pixels PXR, PXG1, and PXB (refer to FIG. 5A), respectively. Each of the red, green, and blue light emitting layers R_EL, G1_EL, and B_EL may include an organic material and/or an inorganic material. The red, green, and blue light emitting layers R_EL, G1_EL, and B_EL may generate light beams having certain colors. For example, the red light emitting layer R_EL may generate red light, the green light emitting layer G1_EL may generate green light, and the blue light emitting layer B_EL may generate blue light.

Although the patterned red, green, and blue light emitting layers R_EL, G1_EL, and B_EL are illustrated in an embodiment, one light emitting layer may be commonly disposed in the first to third emissive areas PXA-R, PXA-G, and PXA-B. For example, the light emitting layer may generate white light or blue light. Furthermore, the light emitting layer may have a multi-layer structure called a tandem structure.

Each of the red, green, and blue light emitting layers R_EL, G1_EL, and B_EL may include a low molecular weight organic material or a high molecular weight organic material as a luminescent material. In another example, each of the red, green, and blue light emitting layers R_EL, G1_EL, and B_EL may include a quantum-dot material as a luminescent material. A core of a quantum dot may be selected from Group II-VI compounds, Group III-V compounds, Group IV-VI compounds, Group IV elements, Group IV compounds, and combinations thereof.

A second electrode layer may be disposed on the light emitting layer. The second electrode layer may include the red, green, and blue cathode electrodes R_CE, G1 CE, and B_CE. The red, green, and blue cathode electrodes R_CE, G1 CE, and B_CE may be connected (e.g., electrically connected) with one another. In an embodiment, the red, green, and blue cathode electrodes R_CE, G1 CE, and B_CE may be integral formed with each other. For example, the red, green, and blue cathode electrodes R_CE, G1 CE, and B_CE may be commonly disposed in the first to third emissive areas PXA-R, PXA-G, and PXA-B, the first to third non-emissive areas NPXA-R, NPXA-G, and NPXA-B, and the non-pixel area NPA.

The element layer DP_ED may further include the light sensing elements OPD1 and OPD2 (refer to FIG. 4). Each of the light sensing elements OPD1 and OPD2 may be a photo diode. The pixel defining film PDL may further include a fourth opening OP4 formed to correspond to the light sensing elements OPD1 and OPD2.

The first light sensing element OPD1 may include the first anode electrode O_AE1, the first photoelectric conversion layer O_RL1, and a first cathode electrode O_CE1. The first anode electrode O_AE1 and the first electrode layer may be disposed on the same layer. For example, the first anode electrode O_AE1 may be disposed on the circuit layer DP_CL. For example, the first anode electrode O_AE1 and the red, green, and blue anode electrodes R_AE, G1_AE, and B_AE may be simultaneously formed by the same process.

The fourth opening OP4 of the pixel defining film PDL may expose at least a portion of the first anode electrode O_AE1. The first photoelectric conversion layer O_RL1 may be disposed on the first anode electrode O_AE1 exposed by the fourth opening OP4. The first photoelectric conversion layer O_RL1 may include an organic photo sensing material. The first cathode electrode O_CE1 may be disposed on the first photoelectric conversion layer O_RL1. The first cathode electrode O_CE1 may be simultaneously formed by the same process as the red, green, and blue cathode electrodes R_CE, G1 CE, and B_CE. In an embodiment, the first cathode electrode O_CE1 may be integral formed with the red, green, and blue cathode electrodes R_CE, G1 CE, and B_CE.

The first anode electrode O_AE1 and the first cathode electrode O_CE1 may each receive an electrical signal. The first cathode electrode O_CE1 and the first anode electrode O_AE1 may receive different signals. Accordingly, a certain electric field may be formed between the first anode electrode O_AE1 and the first cathode electrode O_CE1. The first photoelectric conversion layer O_RL1 may generate an electrical signal corresponding to light incident on the sensor. The first photoelectric conversion layer O_RL1 may generate charges by absorbing energy of the incident light. For example, the first photoelectric conversion layer O_RL1 may include a photosensitive semiconductor material.

The charges generated in the first photoelectric conversion layer O_RL1 may change the electric field between the first anode electrode O_AE1 and the first cathode electrode O_CE1. The amount of charges generated in the first photoelectric conversion layer O_RL1 may vary according to whether light is incident on the first light sensing element OPD1 and the amount and intensity of light incident on the first light sensing element OPD1. Accordingly, the electric field formed between the first anode electrode O_AE1 and the first cathode electrode O_CE1 may vary. The first light sensing element OPD1 according to an embodiment may obtain (or sense) fingerprint information of the user through the change in the electric field between the first anode electrode O_AE1 and the first cathode electrode O_CE1.

However, embodiments are not limited thereto, and the first light sensing element OPD1 may include a phototransistor with the first photoelectric conversion layer O_RL1 as an active layer. For example, the first light sensing element OPD1 may obtain fingerprint information by sensing the amount of current flowing through the phototransistor. The first light sensing element OPD1 according to an embodiment may include various photoelectric conversion elements capable of generating an electrical signal in response to a change in the amount of light. However, embodiments are not limited thereto.

The encapsulation layer TFE may be disposed on the element layer DP_ED. The encapsulation layer TFE may include at least an inorganic layer or an organic layer. In an embodiment, the encapsulation layer TFE may include two inorganic layers and an organic layer disposed therebetween. In an embodiment, the encapsulation layer TFE may include inorganic layers and organic layers that are alternately stacked one above another.

The inorganic encapsulation layer may protect the red, green, and blue light emitting elements ED_R, ED_G1, and ED_B and the first light sensing element OPD1 from moisture/oxygen, and the organic encapsulation layer may protect the red, green, and blue light emitting elements ED_R, ED_G1, and ED_B and the first light sensing element OPD1 from foreign matter such as dust particles. The inorganic encapsulation layer may include, but embodiments are not limited thereto, a silicon nitride layer, a silicon oxy-nitride layer, a silicon oxide layer, a titanium oxide layer, or an aluminum oxide layer. The organic encapsulation layer may include, but embodiments are not limited to, e.g., an acrylate-based organic layer.

The display device DD may include the input sensing layer ISL disposed on the display panel DP and the color filter layer CFL disposed on the input sensing layer ISL.

The input sensing layer ISL may be disposed (e.g., directly disposed) on the encapsulation layer TFE. The input sensing layer ISL may include a first conductive layer ICL1, an insulating layer IL, a second conductive layer ICL2, and a protective layer PL. The first conductive layer ICL1 may be disposed on the encapsulation layer TFE. Although FIGS. 13A and 13B illustrate the structure in which the first conductive layer ICL1 is disposed (e.g., directly disposed) on the encapsulation layer TFE, embodiments are not limited thereto. The input sensing layer ISL may further include a base insulating layer disposed between the first conductive layer ICL1 and the encapsulation layer TFE. For example, the encapsulation layer TFE may be covered by the base insulating layer, and the first conductive layer ICL1 may be disposed on the base insulating layer. In an embodiment, the base insulating layer may include an inorganic insulating material.

The insulating layer IL may cover the first conductive layer ICL1. The second conductive layer ICL2 may be disposed on the insulating layer IL. Although FIGS. 13A and 13B illustrate the structure in which the input sensing layer ISL includes the first and second conductive layers ICL1 and ICL2, embodiments are not limited thereto. For example, the input sensing layer ISL may include only one of the first and second conductive layers ICL1 and ICL2.

The protective layer PL may be disposed on the second conductive layer ICL2. The protective layer PL may include an organic insulating material. The protective layer PL may function to protect the first and second conductive layers ICL1 and ICL2 from moisture/oxygen and protect the first and second conductive layers ICL1 and ICL2 from foreign matter.

The color filter layer CFL may be disposed on the input sensing layer ISL. The color filter layer CFL may be disposed (e.g., directly disposed) on the protective layer PL. The color filter layer CFL may include a first color filter CF_R, a second color filter CF_G, and a third color filter CF_B. The first color filter CF_R may have a first color, the second color filter CF_G may have a second color, and the third color filter CF_B may have a third color. In an embodiment, the first color may be red, the second color may be green, and the third color may be blue.

The color filter layer CFL may further include a dummy color filter DCF. In an embodiment, in case that the area, in which the first photoelectric conversion layer O_RL1 is disposed, is defined as a sensing area SA and the area around the sensing area SA is defined as a non-sensing area NSA, the dummy color filter DCF may be disposed to correspond to the sensing area SA. The dummy color filter DCF may overlap the sensing area SA and the non-sensing area NSA. In an embodiment, the dummy color filter DCF and one of the first to third color filters CF_R, CF_G, and CF_B may have the same color. In an embodiment, the dummy color filter DCF and the second color filter CF_G may have the same green color.

The color filter layer CFL may further include a black matrix BM. The black matrix BM may be disposed to correspond to the non-pixel area NPA. The black matrix BM may overlap the first and second conductive layers ICL1 and ICL2 in the non-pixel area NPA. In an embodiment, the black matrix BM may overlap the non-pixel area NPA, the first to third non-emissive areas NPXA-G, NPXA-B, and NPXA-R, and the non-sensing area NSA. The black matrix BM may not overlap the first to third emissive areas PXA-R, PXA-G, and PXA-B and the sensing area SA.

In the black matrix BM, first to fourth black openings B_OP1, B_OP2, B_OP3, and B_OP4 may be formed to correspond to the first to third emissive areas PXA-R, PXA-G, and PXA-B and the sensing area SA. The first and second black openings B_OP1 and B_OP2 may have shapes corresponding to the red and blue light emitting elements ED_R and ED_B, and the third black opening B_OP3 may have a shape corresponding to the first green light emitting element ED_G1. The fourth black opening B_OP4 may have a shape corresponding to the first light sensing element OPD1. However, embodiments are not limited thereto. In another example, the fourth black opening B_OP4 may have a different shape from the first light sensing element OPD1. For example, the fourth black opening B_OP4 may have a square shape even though the first light sensing element OPD1 has a circular shape.

The color filter layer CFL may further include an over-coating layer OCL. The over-coating layer OCL may include an organic insulating material. The over-coating layer OCL may have a thickness for removing the step differences between the first to third color filters CF_R, CF_G, and CF_B. Without any specific limitation, the over-coating layer OCL may include any material that has a certain thickness and is capable of flattening the upper surface of the color filter layer CFL. For example, the over-coating layer OCL may include an acrylate-based organic material.

Referring to FIG. 13B, in case that the display device DD (refer to FIG. 1) operates, the red, green, and blue light emitting elements ED_R, ED_G1, and ED_B may output light. The red light emitting elements ED_R may output red light in a red wavelength band, the green light emitting elements ED_G1 may output green light in a green wavelength band, and the blue light emitting elements ED_B may output blue light in a blue wavelength band.

In an embodiment, the first light sensing element OPD1 may receive light from specific light emitting elements (e.g., the green light emitting element ED_G1) among the red, green, and blue light emitting elements ED_R, ED_G1, and ED_B. For example, green light Lg1 may be output from the green light emitting elements ED_G1, and the first light sensing element OPD1 may receive green reflected light Lg2 obtained by reflection of the green light Lg1 by the user's fingerprint. The green light Lg1 and the green reflected light Lg2 may be green light in the green wavelength band. The dummy color filter DCF may be disposed over the light sensing elements OPD. The dummy color filter DCF may be a green color filter. Accordingly, the green reflected light Lg2 may pass through the dummy color filter DCF and may be incident on the first light sensing element OPD1.

For example, red light and blue light output from the red and blue light emitting elements ED_R and ED_B may also be reflected by the user's hand US_F. For example, in case that light obtained by reflection of red light Lr1 output from the red light emitting elements ED_R by the user's hand US_F is defined as red reflected light Lr2, the red reflected light Lr2 may not pass through the dummy color filter DCF and may be absorbed by the dummy color filter DCF. Accordingly, the red reflected light Lr2 may not pass through the dummy color filter DCF and may not be incident on the first light sensing element OPD1. Even though blue light is reflected by the user's hand US_F, the blue light may be absorbed by the dummy color filter DCF. Accordingly, only the green reflected light Lg2 may be provided to the first light sensing element OPD1.

According to the embodiments, in case that one or more light sensing elements are disposed in one reference pixel unit, the light sensing elements may be formed to have a different shape from light emitting elements, and thus the light sensing elements may be formed to be large in size. Accordingly, deterioration in the performance of a sensor may be prevented.

For example, by making the shapes of the light sensing elements different from the shapes of the light emitting elements, the gaps between the light sensing elements and the light emitting elements adjacent thereto may be secured according to process constraint conditions (e.g., a minimum mask opening size). Accordingly, the process reliability of the display panel may be improved without deterioration in the performance of the sensor and the resolution of the display panel.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display comprising: a base layer, and a pixel layer disposed on the base layer, the pixel layer including a plurality of reference pixel units and a plurality of sensors, wherein each of the plurality of reference pixel units includes a first light emitting element emitting a first color, a second light emitting element emitting a second color, and a third light emitting element emitting a third color,
   each of the plurality of sensors includes a light sensing element disposed between two second light emitting elements adjacent to each other in a first direction and disposed between the first and third light emitting elements in a second direction intersecting the first direction,
   the second light emitting element has a different shape from the first and third light emitting elements,
   the light sensing element has a different shape from the first and third light emitting elements, and wherein
   each of the plurality of sensors further includes: a light sensing unit; and a sensor drive circuit that drivers the light sensing unit, the light sensing unit includes k light sensing elements, k being an integer of 2 or larger,
   k first electrodes of the k light sensing elements are connected to each other in parallel, one of the k first electrodes is directly connected to the sensor drive circuit, and remains of the k first electrodes are connected to the sensor drive circuit by at least one routing wire, photoelectric conversion layers of the k light sensing elements are spaced apart from each other in the first direction or the second direction, each of the photoelectric conversion layers is disposed between two second light emitting elements adjacent to each other in the first direction, and each light sensing element comprises a first edge extending in the first direction and a second edge extending in the second direction, each of the first and third light emitting elements comprises an edge parallel to the first edge, and the second light emitting element comprises an edge parallel to the second edge, wherein the at least one routing wire has first, second and third wiring edges, the first and second wiring edges forming a first obtuse angle and respectively parallel to first and second sides of a corresponding third light emitting element between the k light sensing elements, the second and third wiring edges forming a second obtuse angle and respectively parallel to the second side and a third side of the corresponding third light emitting element.

2. The display device of claim 1, wherein each of the first and third light emitting elements has an octagonal shape having a first length in the first direction and a second length in the second direction smaller than the first length in the first direction, the second light emitting element has an octagonal shape having same lengths in the first direction and the second direction, and the light sensing element has a rectangular shape.

3. The display device of claim 2, wherein each of the first and third light emitting elements includes first and second sides parallel to the first direction, third and fourth sides parallel to the second direction, and first to fourth inclined sides inclined with respect to the first and second directions, the first and second sides are longer than the third and fourth sides, and the first to fourth inclined sides have a same length.

4. The display device of claim 3, wherein vertical sides of the light sensing element parallel to the first direction have a length smaller than or equal to lengths of the first and second sides of each of the first and third light emitting elements.

5. The display device of claim 2, wherein the second light emitting element includes first and second sides parallel to the first direction, third and fourth sides parallel to the second direction, and first to fourth inclined sides inclined with respect to the first and second directions, the first and second sides and the third and fourth sides have a same length, and the first to fourth inclined sides have a same length.

6. The display device of claim 1, wherein each of the first and third light emitting elements has a rectangular shape having a first length in the first direction and a second length in the second direction smaller than the first length in the first direction, and the second light emitting element and the light sensing element have a square shape.

7. The display device of claim 6, wherein vertical sides of the light sensing element parallel to the first direction have a length smaller than or equal to lengths of first and second sides of each of the first and third light emitting elements parallel to the first direction.

8. The display device of claim 1, wherein at least one of the second light emitting element and the light sensing element has a circular shape.

9. The display device of claim 8, wherein the second light emitting element has an oval shape, and the light sensing element has the circular shape.

10. The display device of claim 8, wherein each of the first and third light emitting elements includes first and second sides having a linear shape parallel to the first direction and third and fourth sides having a round shape.

11. The display device of claim 8, wherein each of the first and third light emitting elements has an oval shape having a major axis parallel to the first direction.

12. The display device of claim 1, wherein each of the first and third light emitting elements has an octagonal shape having a first length in the first direction and a second length in the second direction smaller than the first length in the first direction, the second light emitting element has an octagonal shape having a first length in the second direction and a second length in the first direction smaller than the first length in the second direction, and the light sensing element has a square shape.

13. The display device of claim 12, wherein each of the first and third light emitting elements includes first and second sides parallel to the first direction, third and fourth sides parallel to the second direction, and first to fourth inclined sides inclined with respect to the first and second directions, the first and second sides are longer than the third and fourth sides, and the first to fourth inclined sides have a same length.

14. The display device of claim 13, wherein vertical sides of the light sensing element parallel to the second direction have a length smaller than or equal to lengths of the third and fourth sides of each of the first and third light emitting elements.

15. The display device of claim 12, wherein the second light emitting element includes first and second sides parallel to the first direction, third and fourth sides parallel to the second direction, and first to fourth inclined sides inclined with respect to the first and second directions, and the first and second sides are shorter than the third and fourth sides.

16. The display device of claim 15, wherein the first and third inclined sides of the second light emitting element face each other, and have a same length, the second and fourth inclined sides of the second light emitting element face each other and have a same length, and the first and second inclined sides of the second light emitting element have different lengths.

17. The display device of claim 1, wherein each of the plurality of reference pixel units includes a first pixel including the first light emitting element, two second pixels, each of which includes the second light emitting element, and a third pixel including the third light emitting element, and two light sensing elements are disposed in each of the plurality of reference pixel units.

18. The display device of claim 1, wherein the light sensing element comprises vertical sides parallel to the first direction.

19. An electronic device comprising: a display module; and a housing accommodating the display module, the display module comprising:
- a base layer, and a pixel layer disposed on the base layer, the pixel layer including a plurality of reference pixel units and a plurality of sensors, wherein
- each of the plurality of reference pixel units includes a first light emitting element emitting a first color, a second light emitting element emitting a second color, and a third light emitting element emitting a third color,
- each of the plurality of sensors includes a light sensing element disposed between two second light emitting elements adjacent to each other in a first direction and disposed between the first and third light emitting elements in a second direction intersecting the first direction,
- each of the first and third light emitting elements includes first and second sides parallel to the first direction,
- the light sensing element has a different shape from the first and third light emitting elements, and
- the light sensing element includes vertical sides parallel to the first direction and having a length smaller than or equal to lengths of the first and second sides of each of the first and third light emitting elements, wherein
- each of the plurality of sensors further includes: a light sensing unit; and a sensor drive circuit that drivers the light sensing unit, the light sensing unit includes k light sensing elements, k being an integer of 2 or larger,
- k first electrodes of the k light sensing elements are connected to each other in parallel, one of the k first electrodes is directly connected to the sensor drive circuit, and remains of the k first electrodes are connected to the sensor drive circuit by at least one routing wire,
- photoelectric conversion layers of the k light sensing elements are spaced apart from each other in the first direction or the second direction,
- each of the photoelectric conversion layers is disposed between two second light emitting elements adjacent to each other in the first direction, and each light sensing element comprises a first edge extending in the first direction and a second edge extending in the second direction,
- each of the first and third light emitting elements comprises an edge parallel to the first edge, and the second light emitting element comprises an edge parallel to the second edge, wherein
- the at least one routing wire has first, second and third wiring edges, the first and second wiring edges forming a first obtuse angle and respectively parallel to first and second sides of a corresponding third light emitting element between the k light sensing elements,
- the second and third wiring edges forming a second obtuse angle and respectively parallel to the second side and a third side of the corresponding third light emitting element.

20. The electronic device of claim 19, wherein
- each of the first to third light emitting elements has a square shape, and
- the light sensing element has a rectangular shape having a first length in the first direction and a second length in the second direction smaller than the first length the first direction.

21. The electronic device of claim 19, wherein
- each of the first to third light emitting elements has an octagonal shape having same lengths in the first direction and the second direction, and
- the light sensing element has a rectangular shape having a first length in the first direction and a second length in the second direction smaller than the first length in the first direction.

22. The electronic device of claim 21, wherein
- each of the first to third light emitting elements includes first and second sides parallel to the first direction, third and fourth sides parallel to the second direction, and first to fourth inclined sides inclined with respect to the first and second directions,
- the first and second sides and the third and fourth sides have a same length, and
- the first to fourth inclined sides have a same length.

23. The electronic device of claim 19, wherein the first to third light emitting elements have different sizes.

24. The electronic device of claim 23, wherein
- the second light emitting element has a smaller size than the first and third light emitting elements, and
- the first light emitting element has a size smaller than or equal to a size of the third light emitting element.

25. The electronic device of claim 23, wherein
- the first light emitting element is configured to emit red light,
- the second light emitting element is configured to emit green light, and
- the third light emitting element is configured to emit blue light.

26. The electronic device of claim 19, wherein
- each of the plurality of reference pixel units includes a first pixel including the first light emitting element, two second pixels, each of which includes the second light emitting element, and a third pixel including the third light emitting element, and
- two light sensing elements are disposed in each of the plurality of reference pixel units.

27. The electronic device of claim 19, wherein the second light emitting elements are adjacent to each other in the second direction with no light sensing element, no first light emitting element, and no third light emitting element therebetween.

* * * * *